(12) United States Patent
Chen et al.

(10) Patent No.: US 10,243,713 B2
(45) Date of Patent: Mar. 26, 2019

(54) DMRS BASED DL FOR LOW LATENCY

(71) Applicant: QUALCOMM Incorporated, San Diego, CA (US)

(72) Inventors: Wanshi Chen, San Diego, CA (US); Shimman Arvind Patel, San Diego, CA (US); Peter Gaal, San Diego, CA (US); Hao Xu, San Diego, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 15/013,151

(22) Filed: Feb. 2, 2016

(65) Prior Publication Data

US 2016/0270059 A1 Sep. 15, 2016

Related U.S. Application Data

(60) Provisional application No. 62/133,112, filed on Mar. 13, 2015.

(51) Int. Cl.
*H04L 5/00* (2006.01)
*H04W 48/12* (2009.01)

(52) U.S. Cl.
CPC ........... *H04L 5/0051* (2013.01); *H04W 48/12* (2013.01)

(58) Field of Classification Search
CPC ............................ H04L 5/0051; H04W 48/12
See application file for complete search history.

(56) References Cited

U.S. PATENT DOCUMENTS

2012/0230290 A1* 9/2012 Seo ................. H04L 1/0026
370/329
2012/0250642 A1 10/2012 Qu et al.
(Continued)

OTHER PUBLICATIONS

Huawei et al., "Discussion on DL RS and UL RS for Short TTI," 3GPP TSG RAN WG1 Meeting #83, R1-156460, Anaheim, USA, Nov. 15-22, 2015, 4 pgs., XP_51002920A, 3rd Generation Partnership Project.

(Continued)

*Primary Examiner* — Habte Mered
(74) *Attorney, Agent, or Firm* — Anthony R. Morris

(57) ABSTRACT

Methods, systems, and devices are described for wireless communication at a device. Demodulation reference signals (DMRS) may be used to facilitate demodulation of low latency control or data channels, or both. A wireless communication device may, for example, identify a carrier configuration with transmission time intervals (TTIs) of different durations. A carrier may be configured with TTIs that support low latency operations. A DMRS pattern for resources of a low latency TTI may be determined, and that first DMRS pattern may be based on a DMRS pattern for resources of another, longer-duration TTI. Devices may thus communicate using resources of a low latency TTI based on the first DMRS pattern. For example, a user equipment (UE) may demodulate resources of a low latency channel using the first DMRS pattern, and the first DMRS pattern may be consistent with DMRS patterns supporting non-low latency within a common wireless system.

27 Claims, 17 Drawing Sheets

(56) References Cited

U.S. PATENT DOCUMENTS

| | | | | |
|---|---|---|---|---|
| 2012/0300670 A1* | 11/2012 | Sun | ...................... | H04L 5/0023 370/254 |
| 2012/0307768 A1* | 12/2012 | Xu | ...................... | H04L 5/0023 370/329 |
| 2013/0322277 A1* | 12/2013 | Vanganuru | ............ | H04W 24/08 370/252 |
| 2014/0269520 A1 | 9/2014 | Yi et al. | | |
| 2016/0270072 A1* | 9/2016 | Andgart | ................ | H04L 5/0007 |
| 2017/0164363 A1* | 6/2017 | Zhang | ...................... | H04L 1/00 |
| 2018/0020462 A1* | 1/2018 | Xiong | ................ | H04W 72/1215 |
| 2018/0026684 A1* | 1/2018 | Wei | ...................... | H04B 7/0452 370/329 |
| 2018/0070338 A1* | 3/2018 | Wang | ................... | H04L 5/0048 |

OTHER PUBLICATIONS

ISA/EPO, International Search Report and Written Opinion of the International Searching Authority, Int'l. App. No. PCT/US2016/016423, dated Apr. 22, 2016, European Patent Office, Rijswijk, NL, 13 pgs.

\* cited by examiner

DMRS BASED DL FOR LOW LATENCY

CROSS REFERENCES

The present Application for Patent claims priority to U.S. Provisional Patent Application No. 62/133,112 entitled "DMRS Based DL for ULL," filed Mar. 13, 2015, assigned to the assignee hereof, and expressly incorporated by reference herein.

BACKGROUND

The following relates generally to wireless communication, and more specifically to demodulation reference signal (DMRS) based downlink (DL) demodulation for low latency (LL) communication. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may otherwise be known as user equipment (UE).

In some wireless communication systems, certain UEs may communicate using low latency operations. Such communications may include DL demodulation utilizing cell-specific reference (CRS) signals. But certain UE operations, including low latency operations may be efficiently or effectively accomplished with other demodulation schemes.

SUMMARY

Systems, methods, and apparatuses for DMRS based DL demodulation for low latency (LL) operation are described. A wireless communication device may, for example, identify a carrier configuration with transmission time intervals (TTIs) of different durations. For instance, a carrier may be configured with TTIs that support low latency operations. The device may determine a demodulation reference signal (DMRS) pattern for resources of a low latency TTI, and that first DMRS pattern may be based on a DMRS pattern for resources of another, longer-duration TTI. The device may thus communicate using resources of the low latency TTI based on the first DMRS pattern. For example, the device may be a UE, and it may demodulate resources of a low latency data channel using the first DMRS pattern.

A method of wireless communication is described. The method may include identifying a carrier configuration configured with a first TTI that has a first TTI duration and a second TTI that has a second TTI duration greater than the first TTI duration. The method may also include determining a first DMRS pattern for resources of the first TTI, where the first DMRS pattern is based at least in part on a second DMRS pattern for resources of the second TTI, and communicating using resources of the first TTI based at least in part on the first DMRS pattern.

An apparatus for wireless communication is described. The apparatus may include means for identifying a carrier configuration configured with a first TTI that has a first TTI duration and a second TTI that has a second TTI duration greater than the first TTI duration. The apparatus may also include means for determining a first DMRS pattern for resources of the first TTI, where the first DMRS pattern is based at least in part on a second DMRS pattern for resources of the second TTI and means for communicating using resources of the first TTI based at least in part on the first DMRS pattern.

A further apparatus for wireless communication is described. The apparatus may include a processor, memory in electronic communication with the processor, and instructions stored in the memory and operable, when executed by the processor, to cause the apparatus to identify a carrier configuration configured with a first TTI that has a first TTI duration and a second TTI that has a second TTI duration greater than the first TTI duration. The instructions may also be executable to cause the apparatus to determine a first DMRS pattern for resources of the first TTI, where the first DMRS pattern is based at least in part on a second DMRS pattern for resources of the second TTI, and communicate using resources of the first TTI based at least in part on the first DMRS pattern.

A non-transitory computer-readable medium storing code for wireless communication is described. The code may include instructions executable to identify a carrier configuration configured with a first TTI that has a first TTI duration and a second TTI that has a second TTI duration greater than the first TTI duration. The instructions may also be executable to determine a first DMRS pattern for resources of the first TTI, wherein the first DMRS pattern is based at least in part on a second DMRS pattern for resources of the second TTI and communicate using resources of the first TTI based at least in part on the first DMRS pattern.

In some examples of the methods, apparatuses, and computer readable media described herein, the first DMRS pattern is configured with a port multiplexing based at least in part on a transmission rank. In some examples, the port multiplexing comprises an orthogonal cover code (OCC). Additionally or alternatively, the second TTI may be a Long Term Evolution (LTE) subframe and the first TTI may include one or more LTE symbol periods. In some examples, the first DMRS pattern and the second DMRS pattern are code division multiplexed (CDM) or frequency division multiplexed (FDM), or both.

Some examples of the methods, apparatuses, and computer readable media described herein include features, instructions, or means for receiving signaling indicative of the first DMRS pattern, wherein the first DMRS pattern comprises a deterministic pattern. In some examples, the signaling indicative of the first DMRS pattern comprises at least one of a port value, an OCC, or a relationship of a low latency data channel and a low latency control channel, or any combination thereof.

Some examples of the methods, apparatuses, and computer readable media described herein include features, instructions, or means for identifying a control region of the second TTI, wherein the second TTI comprises the first TTI. Some examples also include and features, instructions, or means for refraining from communication using the first DMRS pattern during the first TTI within the control region of the second TTI.

Some examples of the methods, apparatuses, and computer readable media described herein include features, instructions, or means for identifying a third TTI that has a third TTI duration less than the second TTI duration, determining a cell-specific reference signal (CRS) pattern, and communicating using resources of the third TTI based at least in part on the CRS pattern. Some examples may include features, instructions, or means for monitoring a first low latency control channel search space associated with the first TTI based at least in part on the first DMRS pattern and monitoring a second low latency control channel search space associated with the third TTI based at least in part on the CRS pattern.

Some examples of the methods, apparatuses, and computer readable media described herein include features, instructions, or means for monitoring a control channel search space in the first TTI, where the monitoring based at least in part on the first DMRS pattern or a CRS pattern. In some examples, the first TTI comprises a bundle of resource blocks with a same precoding.

Some examples of the methods, apparatuses, and computer readable media described herein include features, instructions, or means for receiving signaling including a scrambling identification, wherein communicating comprises distinguishing a DMRS symbol of the first DMRS pattern from a DMRS symbol of the second DMRS pattern based at least in part on the scrambling identification. Additionally or alternatively, some examples include features, instructions, or means for determining at least one port based at least in part on the first DMRS pattern. In some examples, the communicating using resources of the first TTI are based at least in part on a transmission rank. Some examples may also include features, instructions, or means for communicating using resources of a third TTI based at least in part on the first DMRS pattern. In some examples, the third TTI has the second TTI duration; in other examples, the third TTI has a third TTI duration that is less than the second TTI duration.

DETAILED DESCRIPTION

Figure 1:
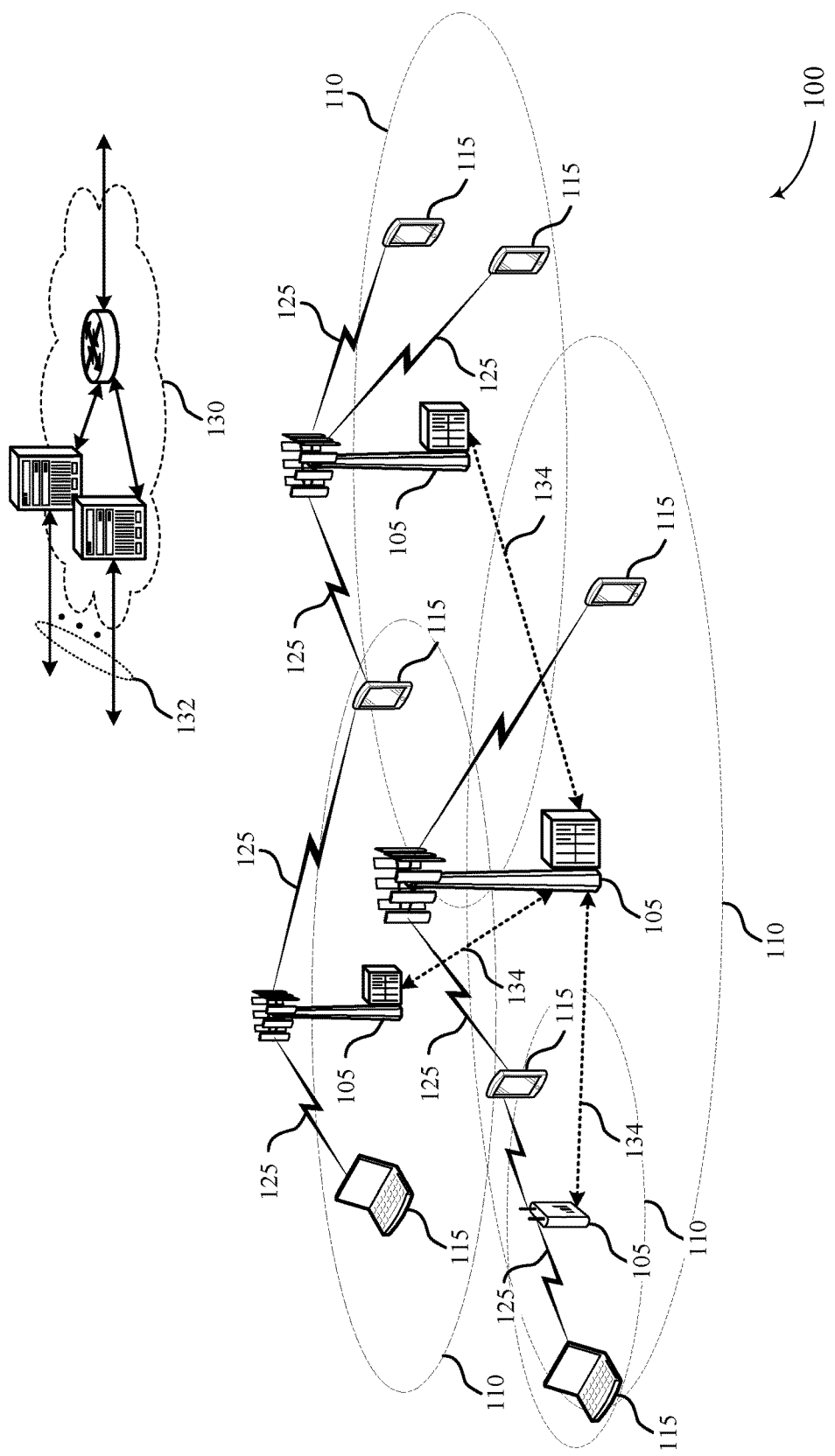
FIG. 1 illustrates an example of a wireless communications system that supports DMRS based DL low latency operations in accordance with various aspects of the present disclosure.

A wireless communications device may use DMRS based downlink (DL) low latency operations to facilitate demodulation. DMRS based DL demodulation may, for example, be helpful for supporting multi-user multiple input, multiple output (MU-MIMO) communication in systems with several devices employing low latency operations, and it may be helpful for MU-MIMO communication in systems with devices employing both low latency and non-low latency operation. In some cases, DMRS based DL low latency operations may facilitate faster processing than, for instance, CRS based demodulation. Various types of multiplexing, including transmission rank-dependent multiplexing may be used to support DMRS based DL low latency operations. DMRS symbols of a low latency DMRS pattern may thus occupy different time and frequency resources, and the low latency DMRS pattern may be based on a non-low latency DMRS pattern. These patterns may, in some examples, be dynamically indicated to a UE from a base station, and the UE may utilize a low latency DMRS pattern to demodulate a data channel in the same symbol period or in subsequent symbol periods, or both. DMRS based DL low latency may support non-orthogonal operation or physical resource block (PRB) bundling, or both. In some cases, DMRS based DL low latency operation may be employed in conjunction with CRS based demodulation, and a control region of a non-low latency (e.g., LTE) TTI may include low latency DMRS symbols. These and other aspects of the disclosure are illustrated by and described with reference to system diagrams, apparatus diagrams, and flowcharts that relate to DMRS based DL low latency operation FIG. 1 illustrates an example of a wireless communications system 100 that supports DMRS based DL low latency operations in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. In some cases, wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may thus be configured with multiple downlink CCs and one or more uplink CCs for carrier aggregation. Carrier aggregation may be used with both FDD and TDD component carriers.

The base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). In some cases, base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) 105 in some examples. The base stations 105 may support and may utilize DMRS based DL low latency operation to facilitate faster processing of certain delay intolerant communications with low latency capable UEs 115.

The UEs 115 may be dispersed throughout the wireless communications system 100 and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may, in various examples, be a cellular phone, a wireless modem, a handheld device, a personal computer, a tablet, a personal electronic device, a machine type communication (MTC) device or the like. The UEs 115 may communicate with base stations 105. Certain UEs 115 may be configured for low latency operation and may thus may support DMRS based DL low latency operations. Such UEs 115 may be referred to as low latency or low latency UEs 115. Other UEs 115 may be referred to as non-low latency UEs 115, and the operation or communication that these devices support may be referred to as non-low latency communications, non-low latency operation, or the like. Legacy, as used herein, may refer to operations according to a wireless communications standard that does not support low latency operation. Examples of such non-low latency standards may include LTE Release 8 and LTE Release 10.

LTE systems, including those that support DMRS base DL low latency operation, may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands.

The communication networks that may accommodate some of the various disclosed examples, including wireless communications system 100 of FIG. 1, may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. In some cases, RRC signaling may be utilized to signal DMRS patterns, including low latency DMRS patterns, and carrier configurations to UEs 115. The RRC protocol layer may also be used for core network 130 support of radio bearers for the user plane data.

Data may be divided into logical channels, transport channels, and physical layer channels. Channels may also be classified into Control Channels and Traffic Channels. DL physical channels may, for example, include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data. In some cases, additional low latency physical channels may be employed to support low latency operations. These may include low latency PDCCH (uPDCCH) and low latency PDSCH (uPDSCH) in the downlink and low latency PUCCH (uPUCCH) and low latency PUSCH (uPUSCH) in the uplink.

PDCCH and uPDCCH may carry downlink control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system such as system 100 that employs Multiple Input Multiple Output (MIMO), the DCI must include additional signaling information. DCI size and format may depend on the amount of information as well as factors such as bandwidth, the number of antenna ports, and duplexing mode being utilized.

UEs 115 in wireless communications system 100 may be configured to collaboratively communicate with multiple base stations 105 or multiple antennas of a base station 105 using MIMO techniques. MIMO techniques use multiple antennas on the base stations or multiple antennas on the UE to take advantage of multipath environments to transmit multiple data streams. The wireless communications system 100 may also employ MU-MIMO, which may, for example, allow multiple base stations 105 to transmit, and multiple UEs 115 to receive, separate signals within a common frequency band. As mentioned to above, these MU-MIMO techniques may include communications with several low latency UEs 115 or with several non-low latency UEs 115, or both; and, as described in more detail below, DMRS base DL low latency operation may help support such traffic.

Figure 2:
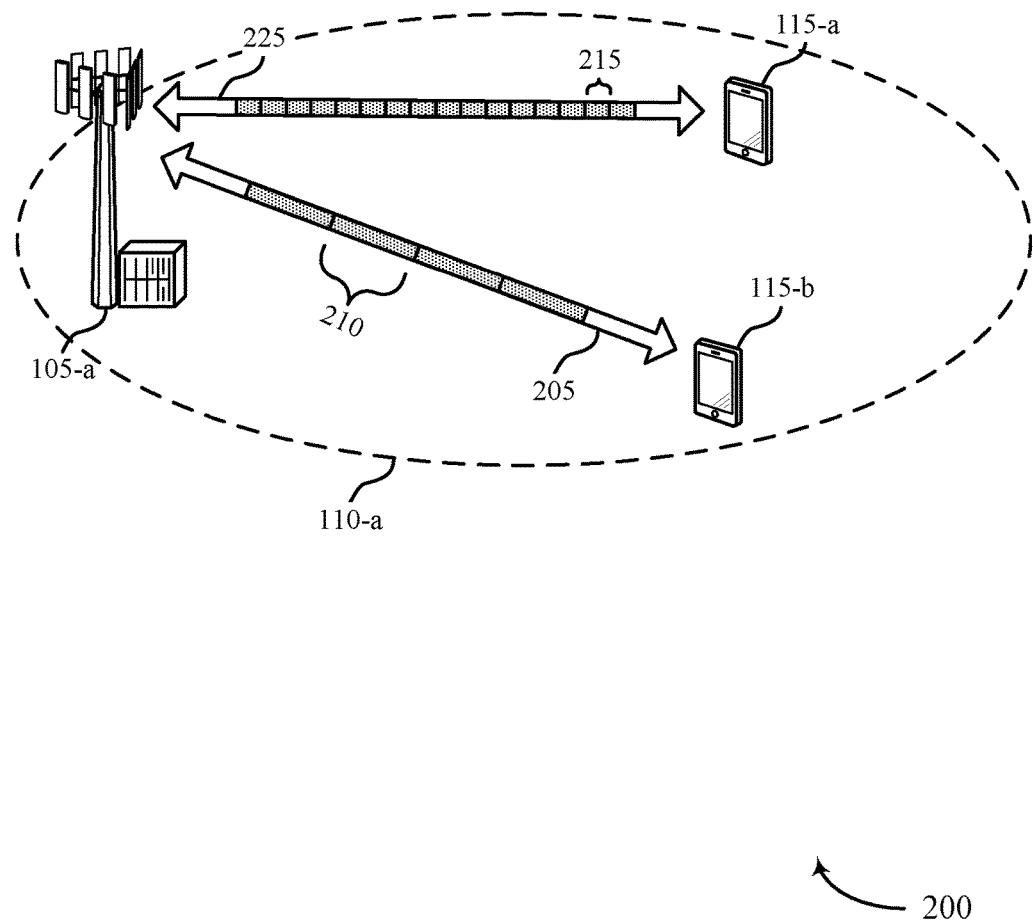
FIG. 2 illustrates an example of a wireless communications system that supports DMRS based DL low latency operations in accordance with various aspects of the present disclosure.

FIG. 2 illustrates an example of a wireless communications system 200 for DMRS based DL low latency operations in accordance with various aspects of the present disclosure. System 200 may illustrate aspects of system 100. For instance, system 200 may include UEs 115-*a* and 115-*b* and a base station 105-*a*, which may be an examples of a UE 115 or base station 105 described with reference to FIG. 1. Base station 105-*b* may communicate with UE 115-*b* via communication link 205 and with UE 115-*a* using DMRS based DL low latency operations over communication link 225, as described with reference to FIG. 1. UEs 115-*a* and 115-*b* may employ MU-MIMO operation.

Base station 105-*a* may insert periodic pilot symbols such as CRS in DL transmissions to aid UEs 115-*a* and 115-*b* in channel estimation and coherent demodulation. CRS may include one of 504 different cell identities. CRS may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (e.g., up to 4) of the receiving UEs 115.

In addition to CRS, which may be utilized by all UEs 115 in the coverage area 110-*a* of the base station 105-*b*, DMRS may be directed toward specific UEs 115-*a* or 115-*b* and may be transmitted on resource blocks assigned to those UEs 115. DMRS may, for instance, include signals on 6 resource elements in each resource block in which they are transmitted. The DMRS for different antenna ports may each utilize the same 6 resource elements, and may be distinguished using different orthogonal cover codes (OCC) (e.g., masking each signal with a different combination of 1 or −1 in different resource elements). In some cases, two sets of DMRS may be transmitted in adjoining resource elements. In some cases, DMRS may be transmitted according to a predefined pattern. That is, DMRS may be sent during certain symbols of a subframe 210 (e.g., symbols 5 and 6). To facilitate DMRS based DL low latency operation, a low latency DMRS pattern may be based on the same or similar pattern, as described below. DMRS may also be referred to as UE-specific reference signals or UE-RS.

Additional reference signals known as channel state information reference signals (CSI-RS) may also be included to aid in generating channel state information (CSI). On the UL, a UE 115 may transmit a combination of periodic sounding reference signal (SRS) and UL DMRS for link adaptation and demodulation, respectively.

Figure 3:
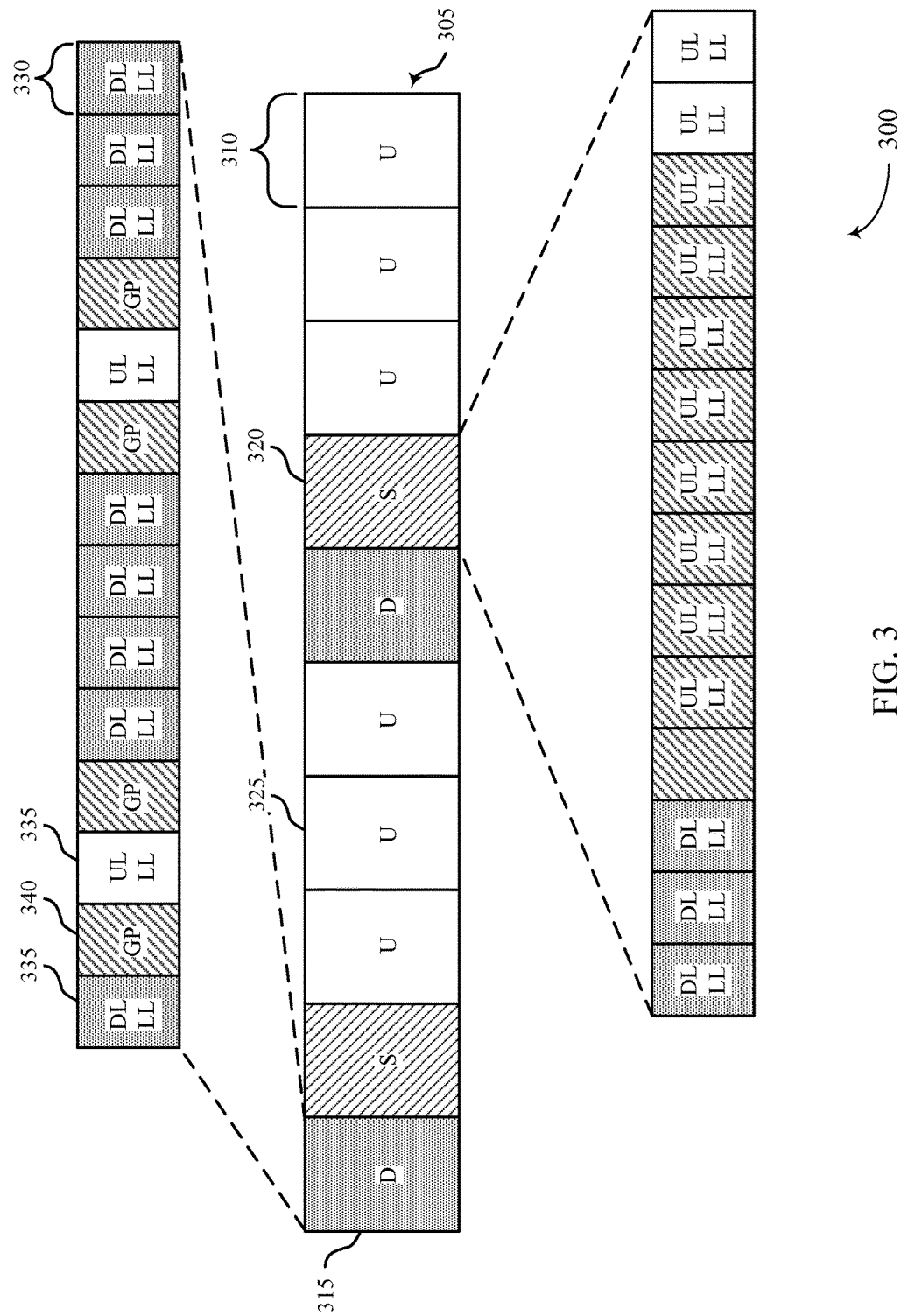
FIG. 3 illustrates an example of a carrier configuration that supports DMRS based DL low latency operations in accordance with various aspects of the present disclosure.

A frame structure may be used within the system 200 to organize physical resources. A frame may be a 10 ms interval that may be further divided into 10 equally sized subframes, as depicted in FIG. 3. Each subframe may include two consecutive time slots. Each slot may include 6 or 7 OFDMA symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a CRS and DMRS as described above. The number of bits carried by each resource element may depend on the modulation scheme (the configuration of symbols that may be selected during each symbol period). Thus, the more resource blocks that a UE receives and the higher the modulation scheme, the higher the data rate may be for the UE. Further details of a frame, subframe, and symbol structure that may be utilized by system 200 are illustrated by and described with reference to FIGS. 3-5.

Figure 4:
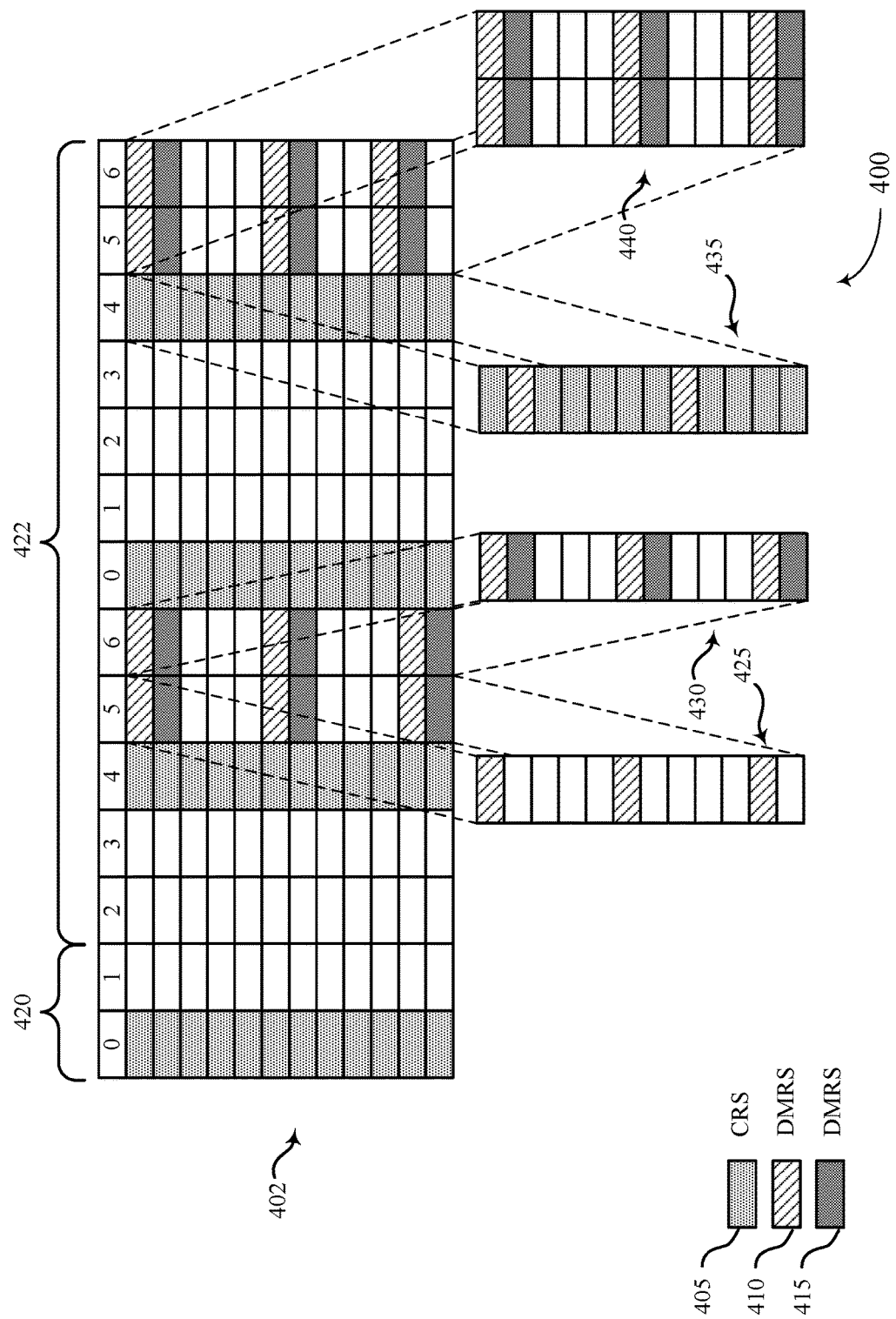
FIGS. 4 and 5 illustrate examples of DMRS patterns that support DMRS based DL low latency operations in accordance with various aspects of the present disclosure.
Figure 5:
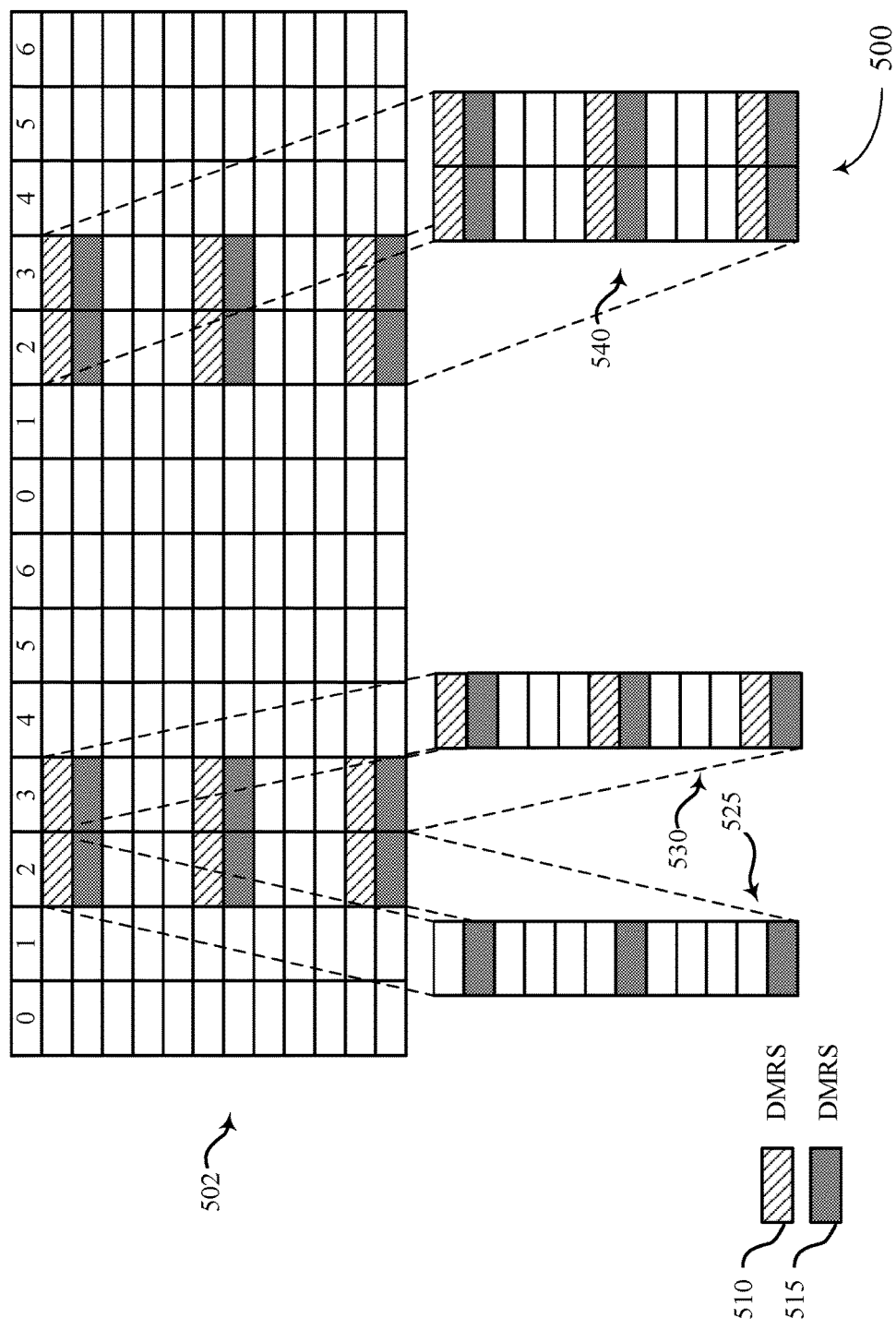

In some cases an LTE subframe 210 may be the smallest scheduling unit, also known as a transmission time interval (TTI). In other cases, a TTI may be shorter than a subframe or may be dynamically selected (e.g., in short TTI bursts or in selected component carriers using short TTIs). System 200 may employ TTIs of varying lengths to communicate with low latency and non-low latency UEs 115. For low latency or low latency operation, TTIs with short durations (e.g., short duration TTIs 215) may be employed. In some cases, using shorter length TTIs may reduce over-the-air latency. For example, short duration TTIs 215 (e.g., on the order of an LTE symbol period) may help reduce HARQ latency as compared with non-low latency TTIs (e.g., an LTE subframe). For instance, system 200 may reduce HARQ latency from 4 ms to 300 μs by employing shorter duration TTIs. By way of example, for normal cyclic prefix (CP) operation, HARQ latency may be reduced by a factor of 14 by using TTIs on the order of symbol period. While if an extended CP is used, HARQ latency may be reduced by a factor of 12. Such latency gains may be realized while maintaining compatibility with non-low latency operations because, as illustrated in FIGS. 3-5 below, system 200 may utilize LTE numerology for low latency operation. For example, the low latency TTI duration may be different, while, tone spacing and symbol duration may be the same. That is, a low latency TTI configuration may use the same tone spacing (e.g., 15 kHz) and symbol duration (e.g., approximately 71 μs) as a non-low latency TTI configuration.

FIG. 3 illustrates an example 300 of a carrier configuration that supports DMRS based DL low latency operations in accordance with various aspects of the present disclosure. Frame configuration 300 may include a frame 305, which may include a number of low latency subframes 310 scheduled for downlink or uplink. Low latency subframes 310 may be examples of subframes 210 as described with reference to FIG. 2, and may be configured to support low latency operation using short duration TTIs. Frame 305 may be used in a FDD or TDD system.

Frame 305 may include a number of low latency downlink subframes 315 and low latency uplink subframes 325. In some cases, frame 305 may include both low latency subframes and non-low latency subframes. The distribution of low latency downlink subframes 315 and low latency uplink subframes 325 may be determined by a base station 105 according to predefined uplink/downlink TDD configurations. Between the low latency downlink subframes 315 and the low latency uplink frames 325, the base station may not schedule any information. Such scheduling gaps may allow a UE 115 to transition from a downlink setup to an uplink setup. Thus, frame 305 may include special subframes 320 which act as guard periods for occasions when communication direction changes (e.g., from downlink to uplink).

Low latency subframes 310 may be partitioned into smaller segments—e.g., larger TTIs, such as slots, may include smaller TTIs, such as symbols. Smaller or shorter duration TTIs may have duration of one or more symbol periods. For example, low latency subframes 310 may include a number of low latency symbols 330. The low latency symbols 330 may be scheduled to convey downlink data (e.g., downlink symbols) or uplink data (e.g., uplink symbols). In some low-latency configurations, a base station 105 may schedule the low latency symbols 330 of a low latency subframe 310 according to the same or different direction as the low latency subframe 310. A HARQ process may be performed at the symbol-level (e.g., within a low latency subframe 310).

In some cases, a base station 105 may schedule gaps between communication direction changes at the symbol-level (e.g., the gaps may be within a low latency subframe 310). For example, a base station 105 may schedule guard periods 340-*a* and 340-*b*, which may allow a UE 115 to change configurations.

A base station 105 may use control signaling to support different TTI configurations or to support DMRS based DL low latency operation. For instance, a base station 105 may signal to a UE 115 which low latency symbols 330 are for downlink and may include low latency DMRS symbols in the same or a prior TTI. In order to provide for non-low latency operation, a pattern for low latency DMRS symbols—e.g., a low latency DMRS pattern used within symbols 330 of a subframe 310 may be based on a non-low latency DMRS pattern used in the same subframe 310.

DL low latency symbols 335 may include low latency DMRS in many instances; but the use of low latency DMRS for uPDCCH or uPDSCH demodulation may vary within a frame 305 or subframe 310. For example, low latency DMRS may be present in certain subframes 310, or sets (e.g., groups) of subframes 310 of a frame 305. One subframe 310 may not include low latency DMRS (e.g., uPDCCH CRS based demodulation may be used) while a second subframe may include DMRS for DMRS based uPDSCH modulation within that subframe 310. In some examples, the presence of low latency DMRS for uPDSCH may be defined in terms of resource blocks or a subset of resources blocks. For example, a first resource block of a subframe 310 may not include DMRS-based uPDSCH (e.g., CRS based uPDCCH demodulation may be employed) while a second resource block of the subframe may include DMRS to support DMRS based uPDSCH demodulation. In such cases, a low latency UE 115 may monitor a first uPDCCH search space in a symbol period based on low latency DMRS. The low latency UE 115 may also monitor a second uPDCCH search space based on CRS included in the same symbol period. In some cases, the monitoring may be simultaneous. Additionally or alternatively, the low latency UE 115 may simultaneously monitor a first uPDCCH search space in a first symbol period based on low latency DMRS and a second uPDCCH in a second symbol period based on CRS.

In some examples, DMRS transmitted in one subframe 310 or DL low latency symbol 335 period and used to demodulate a DL channel in that TTI may be used for demodulation in a subsequent symbol period or subframe. For example, from the perspective of a UE 115, a DMRS in a previous assignment in a subframe 310 may be used for DL demodulation in a subsequent DL low latency symbol period, completely or partially, for channel interference estimation, or the like. In some cases, the previous assignment and the current assignment may have a different resource allocation. For example, a subframe may have a 10-RB assignment, while symbol period may have a 25-RB assignment, 10 of which may be aligned with the previously assigned subframe transmission. As a result, 10-RBs of the symbol period assignment may have enhanced DMRS based DL low latency operation (e.g., by combining low latency DMRS and non-low latency DMRS in the 10-RB for DMRS operation). Alternatively, in some examples, the 10-RB of the symbol period may exclude low latency DMRS, and non-low latency DMRS may be fully utilized in the 10-RB assignment.

In some cases, a base station 105 may dynamically indicate a scrambling ID with low latency or non-low latency DL transmission in various subframes 310 or DL low latency symbols 335 to facilitate non-orthogonal MU-MIMO operation. These scrambling IDs may be included in various control and data channel transmissions. Such non-orthogonal multiple-access techniques may use code division multiplexing (CDM) techniques to introduce, in an intentional manner, non-orthogonality among low latency and non-low latency UEs 115, for example, and may be used to exploit differences in power or path loss between UEs 115. By way of example, for PDSCH a scrambling ID may be 0 or 1, EPDCCH, which may be an FDM PDCCH region with a subframe 310, may have a scrambling ID of 2, uPDSCH may have a scrambling ID of 3 or 4, and uPDCCH may have a scrambling ID of 5.

Additionally or alternatively, PRB bundling for uPDSCH may be used. PRB bundling may include techniques in which several PRBs have a common precoding. In some cases, the bundling size (e.g., the number of PRBs having a common precoding) may be the same for low latency and non-low latency communications. In other cases, the bundling may be a different size. For example, the PRB bundling for low latency PDSCH may be 5 RBs, which may be larger than (e.g., have more PRBs with a common precoding) than the PRB bundling for non-low latency PDSCH.

low latency channels may be transmitted with ranks. In such instances, MU-MIMO communications with uPDSCH and uPDCCH may be more difficult for a UE 115 than situations in which rank is the same. DMRS based uPDCCH demodulation may thus be constrained to, for example, rank 1 or rank 2 operation. In some examples, the presence of low latency DMRS for uPDCCH demodulation may be pre-defined or semi-statically-configured. For example, the presence of low latency DMRS may be pre-defined (e.g., have a deterministic pattern) to be included in symbols 5/6 of the first and second slots of a subframe 310. Alternatively, the presence of low latency DMRS may be dynamically indicated by a non-low latency control channel. Such an indication may be group-specific or UE-specific. Additionally or alternatively, the mapping of a uPDCCH decoding candidate for a UE 115 to a low latency port may vary according to the candidate. For example, a first decoding candidate may be mapped to low latency antenna port 0, while a second candidate may be mapped to low latency antenna port 2. Furthermore, different UEs may have different mapping in order to support MU-MIMO for uPDCCH.

FIGS. 4 and 5 illustrate examples of DMRS patterns 400 and 500 that support DMRS based DL low latency operations in accordance with various aspects of the present disclosure. Subframe 402 may be an example of a subframe 310 described with reference to FIG. 3, and may illustrate a TTI of a carrier utilized in system 100 or 200 of FIGS. 1 and 2. Subframe 402 may include a number of symbol periods (e.g., 14), seven in each slot, which may support low latency operation. Subframe 402 may include CRS symbols 405 and DMRS symbols 410 and 415. Subframe 402 may include a control region (e.g., PDCCH) 420 and a data region (e.g., PDSCH) 422. In the example of FIG. 4, DMRS symbols 410 and 415 may be transmitted in data region 422 in symbol periods 5 and 6 of each slot. DMRS symbol 410 may, for instance, be non-low latency DMRS of antenna ports 7 and 9, while DMRS symbol 415 may be non-low latency DMRS symbol 415 of antenna ports 8 and 10. In some examples, a UE may identify the control region 420 and may modify communication in low latency TTIs that align with the control region 420. For example, the UE may refrain from communicating using a particular DMRS pattern for low latency communications that occur during control region 420.

DMRS of different antenna ports may be multiplexed according to various schemes: code division multiplexing (CDM) in time, CDM in frequency, or frequency division multiplexing (FDM). As used here, CDM in time may refer to OCC described above. For instance, an antenna port may be CDM in time utilizing an OCC for two adjacent symbols that include DMRS.

Some multiplexing schemes may more suitable for timing configurations that feature short TTIs. In some cases, the suitability of a multiplexing scheme may be based on the rank. For example, FDM may be employed for lower transmission ranks (e.g., rank 1 or rank 2) due to reduced DMRS overhead. While for higher ranks (e.g., rank 3 or above), CDM in time may be beneficial. There may be tradeoffs associated with each multiplexing scheme. For example, CDM in time may increase efficiency but may increase latency as compared to some other techniques. Accordingly, a wireless system may implement rank-dependent DMRS port multiplexing; that is, the system may employ a multiplexing scheme based on the rank of the associated communications.

For rank 1 transmissions, a low latency DMRS pattern may be based on a non-low latency DMRS pattern. For example, in the example of FIG. 4, low latency DMRS pattern 425 depicts low latency DMRS symbols 410 in a pattern that mimics non-low latency DMRS of antenna port 7. Likewise, although not specifically shown, a low latency DMRS pattern may mimic non-low latency DMRS of antenna port 8. These low latency DMRS symbols may be of low latency antenna ports 0 and 1, respectively. In some examples, each low latency DMRS symbol, e.g., each DMRS symbol of low latency DMRS pattern 425 may have a UE-specific masking of 1—that is, each low latency DMRS symbol of the pattern has an OCC of 1. Likewise, each low latency DMRS symbol of low latency antenna port 1 may be masked by 1, except, for example, those low latency DMRS symbols in symbol period 6 of subframe 402, which may be masked by −1. Other symbol-dependent variations are also possible. For instance, in symbol periods 2/4/6, low latency DMRS symbols of low latency port 1 may be masked by −1, and in symbol periods 0/1/3/5 masked by 1. Alternatively, low latency DMRS symbols of low latency antenna port 1 may be masked by 1 in symbol period 5, −1 in symbol period 6, and not masked in other symbol periods. This OCC, or masking, may be used by a UE 115, for example, to reduce interference between adjacent DMRS symbols.

Similar masking may be employed for low latency antenna ports 2 and 3, which may mimic non-low latency DMRS of antenna ports 9 and 10. Thus, low latency antenna port 2 may be masked by 1 in all symbol periods, and low latency antenna port 3 may be masked by 1 in every symbol period but 6, where it may be masked by −1, for example.

For rank 2, a low latency DMRS pattern may similarly be based on a non-low latency DMRS pattern. For example, in the example of FIG. 4, low latency DMRS pattern 430 depicts low latency DMRS symbols 410 and 415 in a pattern that mimics non-low latency DMRS of antenna ports 8 and 10. Likewise, although not specifically shown, a low latency DMRS pattern may mimic non-low latency DMRS of antenna ports 7 and 9. Symbol dependent masking may be applied in this example too, such that an OCC of 1 may be applied for all low latency DMRS symbols transmitted in symbol periods other than 6, and those transmitted in symbol period 6 may be masked by −1. In the case of a low latency DMRS pattern that mimics non-low latency DMRS of antenna ports 7 and 9, each low latency DMRS symbol may be masked by 1.

In some cases, to maintain orthogonality, and to promote efficient multiplexing of low latency and non-low latency MU-MIMO using CDM in time multiplexing, a low latency UE 115 may be scheduled for low latency data in immediately adjacent ("back-to-back") symbol periods. Although, in some cases, such back-to-back low latency scheduling may be avoided, for example if scheduling for low latency and non-low latency UEs 115 is FDM.

For rank 3, or higher, transmissions, a low latency DMRS pattern may similarly be based on a non-low latency DMRS pattern in a pair of symbols, as depicted in low latency DMRS pattern 440. In such cases, low latency DMRS may span at least two symbols. In some examples, a low latency antenna port may be mapped to a non-low latency port (e.g., non-low latency antenna ports 7-14). The mapping may be such that low latency antenna port k is mapped to a non-low latency port k+7 (e.g., low latency port 0 may be mapped to non-low latency port 7).

In some cases, DMRS signals that are multiplexed using CDM may include OCCs that are based on the starting symbol and the ranks. For example, each port may be associated with two symbol sets, each of which gives a different OCC based on the starting symbol. For ranks 3 and 4, this is illustrated by Table 1, where Symbol Set 1 may refer to starting symbol periods 1/3/5 of, for example, subframe 402, and Symbol Set 2 may refer to starting symbol periods 2/4/6 of, for example, subframe 402.

TABLE 1

|  | Symbol Set 1 | Symbol Set 2 |
| --- | --- | --- |
| low latency port 0 | [+1 +1] | [+1 +1] |
| low latency port 1 | [+1 −1] | [−1 +1] |
| low latency port 2 | [+1 +1] | [+1 +1] |
| low latency port 3 | [+1 −1] | [−1 +1] |

Other start-symbol-dependent variations are also possible. Alternatively, the starting symbol can be limited to odd symbol period indices. In such cases, there may be no symbol-dependent masking (e.g., no Symbol Set 2).

For rank 5 and higher, Table 2 illustrates an example of starting-symbol-specific masking, where Symbol Set 1 may refer to starting symbol periods 1/3/5 of, for example, the first slot of subframe 402, Symbol Set 2 may refer to starting symbol periods 2/4/6 of, for example, the first slot of subframe 402, Symbol Set 3 may refer to starting symbol periods 1/3/5 of, for example, the second slot of subframe 402, and Symbol Set 4 may refer to starting symbol periods 2/4/6 of, for example, the second slot of subframe 402.

TABLE 2

|  | Symbol Set 1 | Symbol Set 2 | Symbol Set 3 | Symbol Set 4 |
| --- | --- | --- | --- | --- |
| low latency port 0 | [+1 +1] | [+1 +1] | [+1 +1] | [+1 +1] |
| low latency port 1 | [+1 −1] | [+1 −1] | [−1 +1] | [−1 +1] |
| low latency port 2 | [+1 +1] | [+1 +1] | [+1 +1] | [+1 +1] |
| low latency port 3 | [+1 −1] | [+1 −1] | [−1 +1] | [−1 +1] |
| low latency port 4 | [+1 +1] | [−1 −1] | [+1 +1] | [−1 −1] |
| low latency port 5 | [−1 −1] | [+1 +1] | [−1 −1] | [+1 +1] |
| low latency port 6 | [+1 −1] | [−1 +1] | [−1 +1] | [+1 −1] |
| low latency port 7 | [−1 +1] | [+1 −1] | [+1 −1] | [−1 +1] |

As with lower ranks, other start-symbol-dependent variations are also possible for rank 5 transmissions.

In some examples, a low latency UE 115 may be dynamically indicated whether low latency DMRS is present in a symbol. This may be via low latency or non-low latency control signaling. For a rank 1 transmission, for instance, if low latency DMRS is present, further indications or signaling may identify the port (e.g., port 0 or port 1), OCC type, (e.g., based on non-low latency port 7, port 8, port 9, port 10, or the like), whether uPDSCH rate matching should be based on the number of DMRS resource elements (REs) present in a resource block (RB), etc. For example, control signal may indicate whether uPDSCH rate matching should be based on 3 DMRS REs per RB or 6 DMRS REs per RB. For rank 2 and above, low latency ports may be fixed in some examples, but control signaling may indicate the OCC operation. In some cases, finer granularity may be used to indicate the presence of DMRS (e.g., if the DMRS is present in every RB, every other RB, or not at all). In certain instances, a pre-defined or configurable time-lapse may be used to determine whether a previous low latency DMRS symbol may be used for current uPDSCH/uPDCCH demodulation, as described above. In such instances, the same precoding may be assumed for DMRS in the same time-lapse. By way of example, a DMRS of the last 14 symbols may be used, such that any DMRS of the same subframe may be used for demodulation.

In certain instances, there may be collisions between low latency DMRS symbols 410 or 415 and CRS symbols 405. Accordingly, a low latency DMRS pattern may be configured to avoid placing DMRS symbols 410 and 415 into symbol periods with CRS symbols 405. Thus, for low latency operation during CRS symbol periods, a UE 115 may rely on CRS for DL low latency demodulation. In some examples, however, collisions may be avoided by implementing a frequency shift of CRS in CRS symbols periods. In another example, a UE 115 may give a CRS symbol 405 higher priority than a low latency DMRS symbol 410 or 415 received during the same symbol period. In other examples, a different low latency DMRS pattern 435 may be employed in a CRS symbol period. Additionally or alternatively, different low latency antenna ports may have different frequency shifts.

In some examples, low latency DMRS symbols may be supported in the control region 420 of a subframe 402. In such cases, either DMRS-based uPDSCH demodulation or DMRS-based uPDCCH demodulation, or both, may supported. For example, uPDCCH demodulation may be based on CRS, while uPDSCH demodulation may be based on low latency DMRS. Alternatively, DMRS based demodulation may not be supported in the control region 420. In some cases, reference signal type (e.g., DMRS or CRS) for uPDCCH and uPDSCH demodulation may switch over different symbols, for example from control region 420 to data region 422 of subframe 402.

Additionally, the techniques described above may be used for downlink subframe or special subframes, such as subframes 320 described with reference to FIG. 3. FIG. 5 illustrates a DMRS pattern 500 within a special subframe 502, which may be an example of a special subframe 320. The DMRS pattern 500 may include DMRS symbols 510 and 515, and may utilize low latency DMRS patterns 525, 530, and 540, which may be based on or mimic a non-low latency DMRS pattern as described above with reference to FIG. 4.

Figure 6:
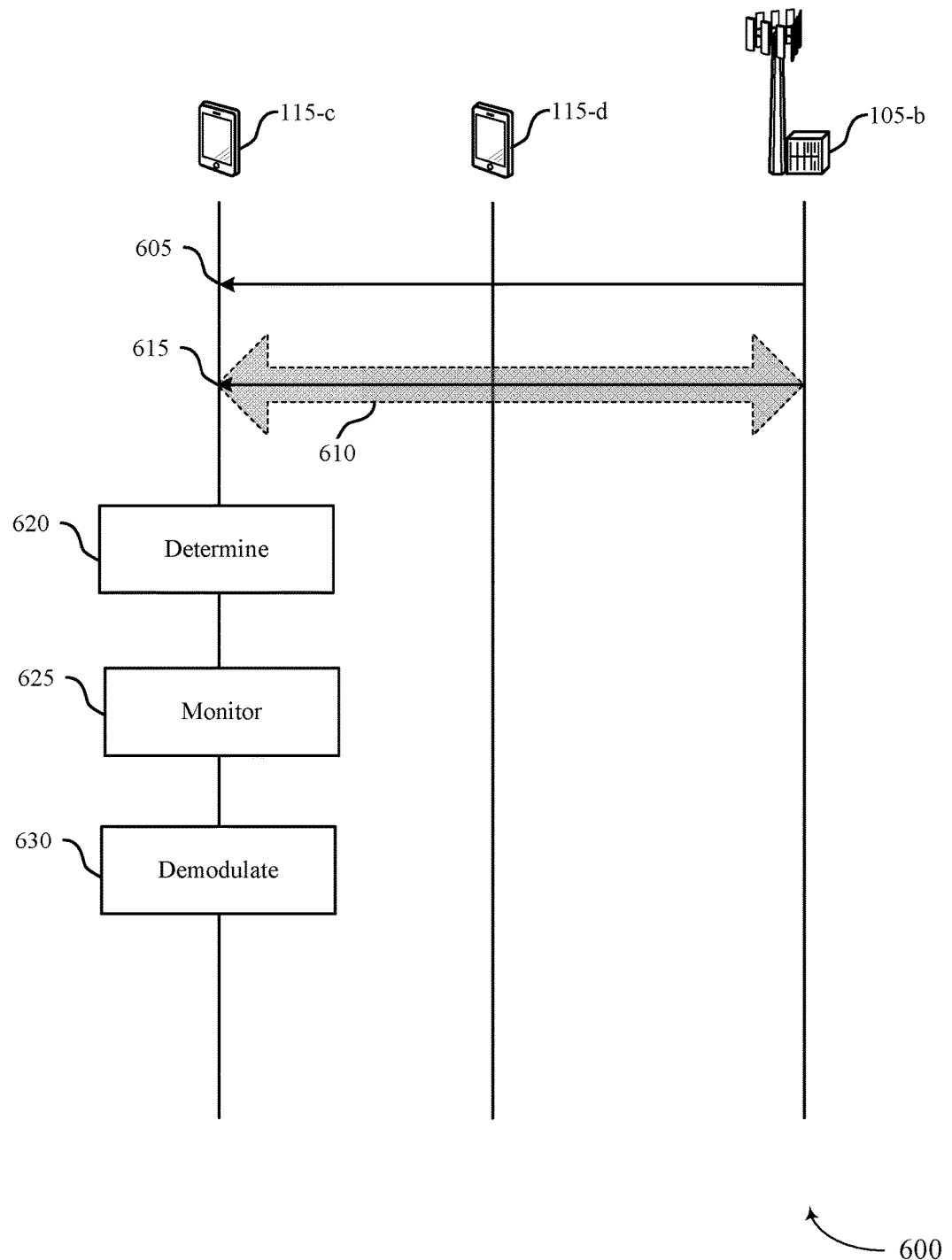
FIG. 6 illustrates an example of a process flow in a system that supports DMRS based DL low latency operations in accordance with various aspects of the present disclosure.

FIG. 6 illustrates an example of a process flow in a system that supports DMRS based DL low latency operations in accordance with various aspects of the present disclosure. Process flow 600 may include UEs 115-c and 115-d and base station 105-b, which may be an example of a UE 115 and base station 105 described herein with reference to FIGS. 1 and 2.

At 605, the base station 105-b may identify, and may configure a UE 115-c with a carrier 610, with a first TTI that has a first TTI duration and a second TTI that has a second TTI duration greater than the first TTI duration. This configuration may be via RRC signaling. UE 115-c may thus identify the carrier configuration by receiving the RRC signaling. The carrier 610 may support both low latency and non-low latency operations, and may be used for MU-MIMO operations to support both UEs 115-c and 115-d.

At 615, base station 105-b may transmit and UE 115-c may receive a DL transmission, which may include low latency channels. The base station 105-b may determine a first DMRS pattern for resources of the first TTI, which may be based on a second DMRS pattern for resources of a second TTI, and may configure the DL transmission accordingly.

At 620, UE 115-c may determine the first DMRS pattern for resources of the first TTI, and the first DMRS pattern may be based on a second DMRS pattern for resources of the second TTI; the first and second DMRS patterns may be different. In some cases, the determination is based on received signaling. For instance, UE 115-c may receive signaling indicative of the first DMRS pattern, where the first DMRS pattern is a deterministic pattern. In some examples, the signaling indicative of the first DMRS pattern includes a port value, an OCC, or a relationship of a low latency data channel and a low latency control channel. The signaling may be RRC signaling or control channel signal, for instance. In some examples, the signaling is received in a control region of the second TTI of the DL transmission at 615.

The base station 105-b and UE 115-c may communicate using resources of the first TTI based on the first DMRS pattern. That is, the base station 105-b may modulate a low latency control or data channel and facilitate demodulation by the UE 115-c using DMRS based DL low latency operation with the first DMRS pattern. In some examples, the first DMRS pattern is configured with a port multiplexing that is based on a transmission rank. In some examples, the port multiplexing includes an OCC. In some cases, the second TTI includes the first TTI, and the OCC for each port may be based on a location of the first TTI in a time domain. The second TTI may, for instance, be an LTE subframe and the first TTI may be an LTE symbol period. In some examples, the OCC for each port may be based on a symbol number of the first TTI. The OCC for the first DMRS pattern may thus be different from an OCC of the second DMRS pattern. In some examples, the first DMRS pattern spans two TTIs of the first duration. In some examples, the first DMRS pattern and the second DMRS pattern are CDM or FDM, or both.

In order to facilitate various demodulation schemes, the UE 115-c may identify a control region of the second TTI. In some examples, the second TTI includes the first TTI, and the control region excludes DMRS symbols of the first DMRS pattern. Alternatively, the control region may include one or several DMRS symbols of the first DMRS pattern. In some examples, a low latency control channel or a low latency data channel, or both, are demodulated based at least in part on the first DMRS pattern.

In some examples, base station 105-b and UE 115-c may identify a third TTI that has the first TTI duration. The third TTI may include a CRS, which may have a CRS pattern. In some examples, the third TTI excludes DMRS symbols of the first DMRS pattern. In some examples, the third TTI includes DMRS symbols of a third DMRS pattern that is different from the first and second DMRS patterns. Additionally or alternatively, the third TTI may include DMRS symbols of the first DMRS pattern. As described herein, a third TTI may have other durations—e.g., the third TTI may have a third TTI duration that is less than the second TTI duration or it may have the second TTI duration in some cases.

The base station 105-b may transmit and UE 115-c may receive the CRS. Thus, UE 115-c may demodulate signals based on DMRS symbols of the first DMRS pattern or the received CRS, or both. In some examples, the second TTI includes the first and third TTIs (e.g., the second TTI may be a subframe and the first and third TTIs may each be symbol periods). At 625, UE 115-c may thus monitor a first low latency control channel search space in the first TTI based on the first DMRS pattern and monitor a second low latency control channel search space in the first TTI based on the received CRS. In some examples, UE 115-c may monitor a first low latency control channel search space in the first TTI based on the first DMRS pattern and monitor a second low latency control channel search space in the third TTI based on the received CRS.

In some examples, UE 115-c may identify a third TTI that has a duration less than the second TTI duration and includes CRS. UE 115-c may communicate using resources of the third TTI based on the CRS. In some cases, UE 115-c may monitor a first low latency control channel search space associated with the first TTI based on the first DMRS pattern, and UE 115-c may monitor a second low latency control channel search space associated with the third TTI based on the CRS (or CRS pattern).

The resources of the first TTI may include a bundle of resource blocks with a same precoding. In some examples, a number of resource blocks in the bundle may be based on whether the first TTI includes a DMRS symbol of the first DMRS pattern.

Additionally or alternatively, base station 105-b may transmit and UE 115-c may receive signaling that includes a scrambling ID. In some examples, UE 115-c may thus distinguish DMRS of the first DMRS pattern from DMRS of the second DMRS pattern utilizing the scrambling ID.

The UE 115-c may determine an antenna port based on the first DMRS pattern. In some examples, the UE 115-c may decode a control channel decoding candidate based on the antenna port. At 630, UE 115-c may thus demodulate a uPDSCH using the first DMRS pattern. The UE 115-c may also communicate using resources of a third TTI having the first TTI duration based on the first DMRS pattern. In some examples, the communicating using resources of the first TTI or the third TTI is based on a transmission rank.

The UE 115 may communicate using resources of a third TTI based on the first DMRS pattern. In some examples, the third TTI has the second TTI duration. In some cases, the resources of the first TTI include a first number of resource blocks and the resources of the third TTI include a second number of resource blocks, and the first and second number of resource blocks are different.

Figure 7:
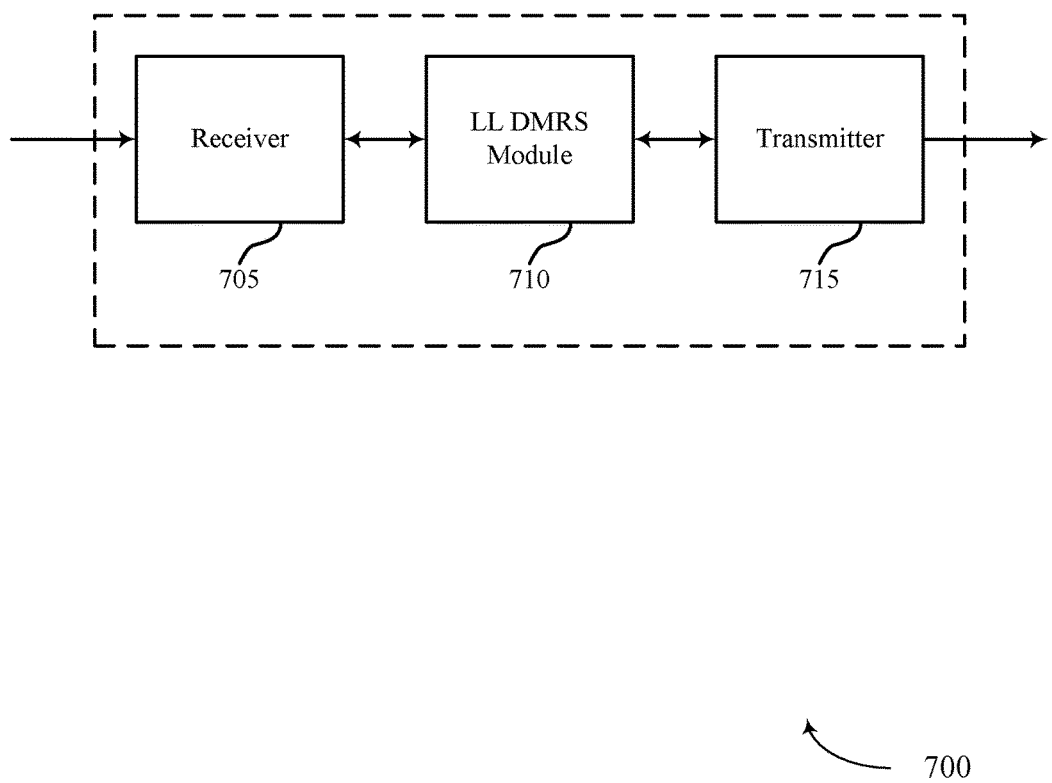
FIG. 7-9 show block diagrams of a wireless device or wireless devices that support DMRS based DL low latency operations in accordance with various aspects of the present disclosure.

FIG. 7 shows a block diagram of a wireless device 700 configured for DMRS based DL low latency operations in accordance with various aspects of the present disclosure. Wireless device 700 may be an example of aspects of a UE 115 or a base station 105 described with reference to FIGS. 1-6. Wireless device 700 may include a receiver 705, a LL DMRS module 710, or a transmitter 715. Wireless device 700 may also include a processor. Each of these components may be in communication with one another.

The receiver 705 may receive information such as packets, user data, or control information associated with various information channels (e.g., control channels, data channels, and information related to DMRS based DL low latency operation, etc.). Information may be passed on to the LL DMRS module 710, and to other components of wireless device 700.

The LL DMRS module 710 may identify a carrier configuration that includes a first TTI that has a first TTI duration and a second TTI that has a second TTI duration greater than the first TTI duration, determine a first DMRS pattern for resources of the first TTI, where the first DMRS pattern is based on a second DMRS pattern for resources of the second TTI. And LL DMRS module 710 may, in combination with the receiver 705 or transmitter 715, for example, communicate using resources of the first TTI based at least in part on the first DMRS pattern.

The transmitter 715 may transmit signals received from other components of wireless device 700. In some examples, the transmitter 715 may be collocated with the receiver 705 in a transceiver module. The transmitter 715 may include a single antenna, or it may include a plurality of antennas.

Figure 8:
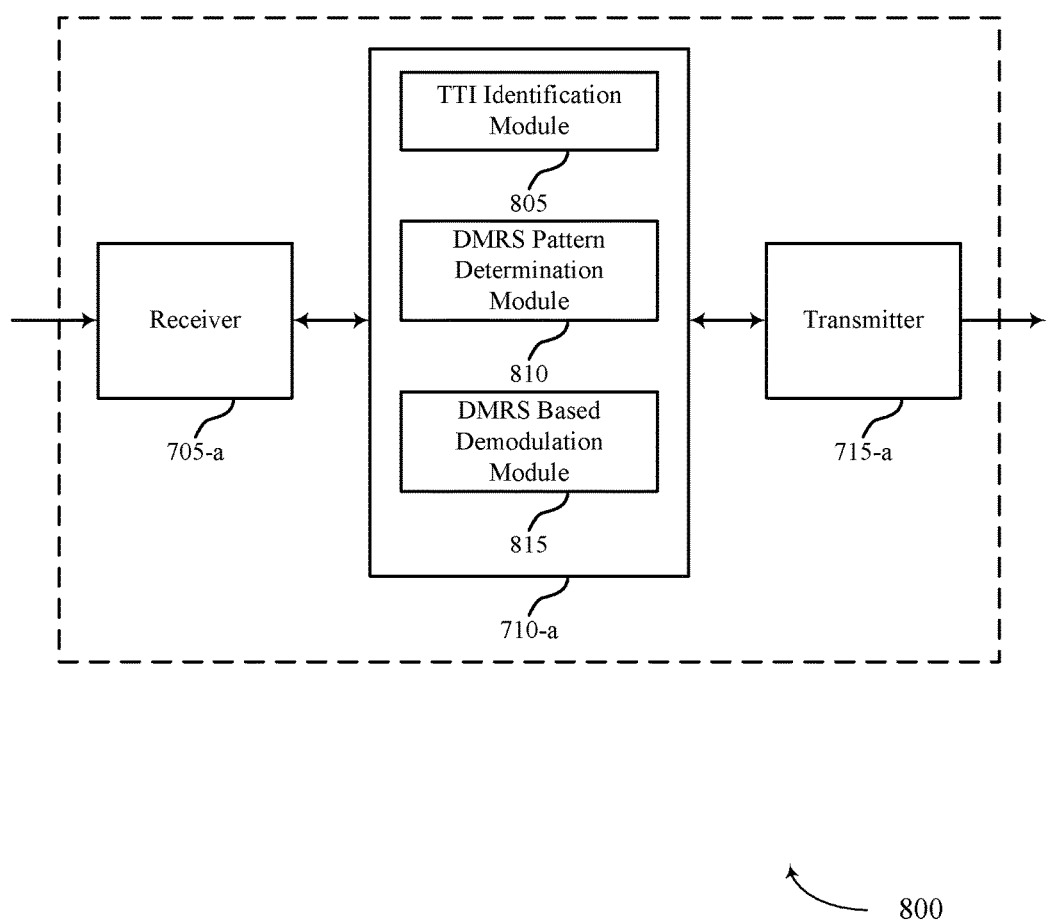

FIG. 8 shows a block diagram of a wireless device 800 for DMRS based DL low latency operations in accordance with various aspects of the present disclosure. Wireless device 800 may be an example of aspects of a wireless device 700 or a UE 115 or a base station 105 described with reference to FIGS. 1-7. Wireless device 800 may include a receiver 705-a, a LL DMRS module 710-a, or a transmitter 715-a. Wireless device 800 may also include a processor. Each of these components may be in communication with one another. The LL DMRS module 710-a may also include a TTI identification module 805, a DMRS pattern determination module 810, and a DMRS based demodulation module 815.

The receiver 705-a may receive information which may be passed on to LL DMRS module 710-a, and to other components of device 800. The LL DMRS module 710-a may perform the operations described herein with reference to FIG. 7. The transmitter 715-a may transmit signals received from other components of wireless device 800.

The TTI identification module 805 may identify a carrier configuration that includes a first TTI that has a first TTI duration and a second TTI that has a second TTI duration greater than the first TTI duration, as described herein with reference to FIGS. 2-6. In some examples, the second TTI may include the first TTI. For instance, the second TTI may be an LTE subframe and the first TTI may be an LTE symbol period. The TTI identification module 805 may also identify a third TTI that has the first TTI duration. In some examples, the second TTI includes the first and third TTIs. Alternatively, the third TTI may have the second TTI duration. In some examples, the resources of the first TTI includes first number of resource blocks and the resources of the third TTI includes a second number of resource blocks, and where the first and second numbers of resource blocks are different.

The DMRS pattern determination module 810 may determine a first DMRS pattern for resources of the first TTI, and the first DMRS pattern may be based on a second, different DMRS pattern for resources of the second TTI, as described herein with reference to FIGS. 2-6. In some examples, the first DMRS pattern spans two TTIs of the first duration. Additionally or alternatively, the first DMRS pattern may be FDM with the second DMRS pattern. In some examples, the third TTI excludes DMRS symbols of the first DMRS pattern. In some examples, the third TTI includes DMRS symbols of a third DMRS pattern that may be different from the first and second DMRS patterns. In some cases, the third TTI may include DMRS symbols of the first DMRS pattern. The device 800 may, in some cases, communicate by distinguishing DMRS of the first DMRS pattern from DMRS of the second DMRS pattern utilizing a scrambling ID.

The DMRS based demodulation module 815 may communicate using resources of the first TTI based on the first DMRS pattern, as described herein with reference to FIGS. 2-6. The DMRS based demodulation module 815 may also communicate using resources of a third TTI based at least in part on the first DMRS pattern.

Figure 9:
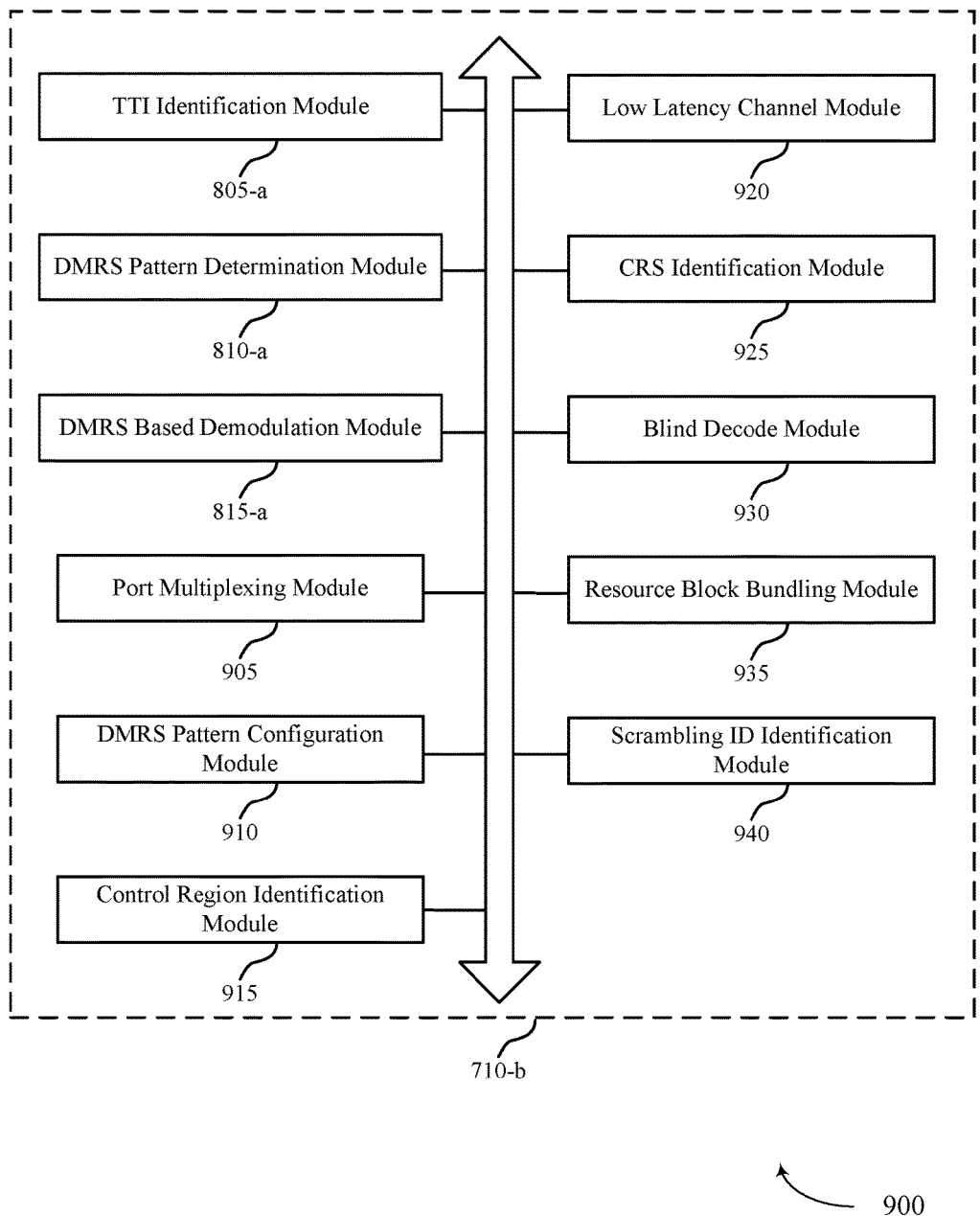

FIG. 9 shows a block diagram 900 of a LL DMRS module 710-b which may be a component of a wireless device 700 or a wireless device 800 of FIGS. 7 and 8; the LL DMRS module 710-b may be an example of aspects of a LL DMRS module 710 described with reference to FIGS. 7-8. The LL DMRS module 710-b may include a TTI identification module 805-a, a DMRS pattern determination module 810-a, and a DMRS based demodulation module 815-a. Each of these modules may perform the functions described herein with reference to FIG. 8. The LL DMRS module 710-b may also include a port multiplexing module 905, a DMRS pattern configuration module 910, a control region identification module 915, a low latency channel module 920, a CRS identification module 925, a blind decode module 930, a resource block bundling module 935, and a scrambling ID identification module 940.

The port multiplexing module 905 may be configured to identify port multiplexing (e.g., masking) of a first DMRS pattern, which may be configured with a port multiplexing based on a transmission rank, as described herein with reference to FIGS. 2-6. In some examples, the port multiplexing includes an OCC. The OCC for each port may be based on a location of the first TTI in a time domain. In some examples, the OCC for each port may be based on a symbol number of the first TTI. The OCC for the first DMRS pattern may be different from an OCC of the second DMRS pattern.

The DMRS pattern configuration module 910 may receive signaling indicative of the first DMRS pattern, and the first DMRS pattern may be a deterministic pattern, as described herein with reference to FIGS. 2-6. In some examples, the signaling indicative of the first DMRS pattern includes at least one of a port value, an OCC, or a relationship of a low latency data channel and a low latency control channel. In some examples, the signaling may be received in a control region of the second TTI.

The control region identification module 915 may identify a control region of the second TTI, as described herein with reference to FIGS. 2-6. In some examples, the control region excludes DMRS symbols of the first DMRS pattern. Alternatively, the control region may include DMRS symbols of the first DMRS pattern.

The low latency channel module 920 may be configured to modulate or demodulate a low latency control channel or a low latency data channel, or both, based on the first DMRS pattern, as described herein with reference to FIGS. 2-6.

The CRS identification module 925 may be configured to identify a third TTI that may include a CRS, as described herein with reference to FIGS. 2-6. The CRS identification module 925, in combination with other modules of the LL DMRS module 900, may also determine a CRS patter for the third TTI and receive the CRS. A device may thus communicate using resources of the third TTI based on the CRS pattern. In some examples, this may facilitate demodulating signals based on DMRS symbols of the first DMRS pattern or the received CRS, or both.

The blind decode module 930 may be configured to monitor a first low latency control channel search space in the first TTI based on the first DMRS pattern and monitor a second low latency control channel search space in the first TTI based on the received CRS, as described herein with reference to FIGS. 2-6. Additionally or alternatively, the blind decode module 930 may be configured to monitor a first low latency control channel search space in the first TTI based at on the first DMRS pattern, and monitor a second low latency control channel search space in the third TTI based at least in part on the received CRS, as described herein with reference to FIGS. 2-6.

The resource block bundling module 935 may be configured to identify or utilize resources of the first TTI that include a bundle of resource blocks with a same precoding, as described herein with reference to FIGS. 2-6. In some examples, a number of resource blocks in the bundle may be based on whether the first TTI includes a DMRS symbol of the first DMRS pattern.

The scrambling ID identification module 940 may receive or identify signaling indicative of a scrambling ID, as described herein with reference to FIGS. 2-6.

The components of wireless devices 700 and 800, and the LL DMRS module 710-b may each, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
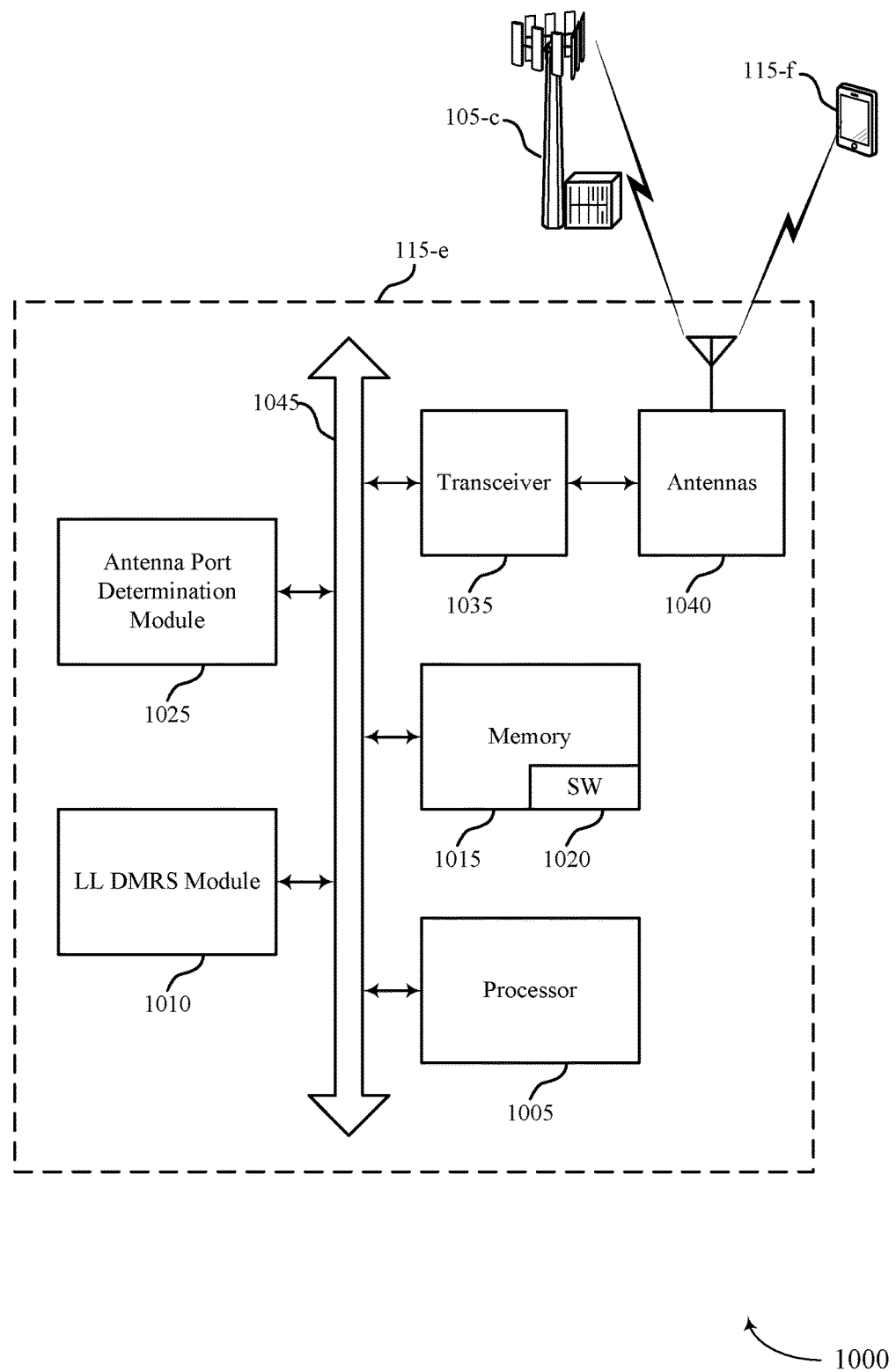
FIG. 10 illustrates an example system including a UE that supports DMRS based DL low latency operations in accordance with various aspects of the present disclosure.

FIG. 10 shows a diagram of a system 1000 configured for DMRS based DL low latency operations in accordance with various aspects of the present disclosure. System 1000 may include UE 115-e, which may be an example of a wireless device 700, a wireless device 800, or a UE 115 described herein with reference to FIGS. 1, 2, 7, and 8. UE 115-e may include a LL DMRS module 1010, which may be an example of a LL DMRS module 710 described with reference to FIGS. 7-9. In some examples, UE 115-e may include an antenna port determination module 1025. UE 115-e may also include components for bi-directional voice and data communications including components for transmitting communications and components for receiving communications. For example, UE 115-e may communicate bi-directionally with base station 105-c or UE 115-f.

The antenna port determination module 1025 may determine an antenna port based on the first DMRS pattern, as described herein with reference to FIGS. 2-6. In some examples, this may facilitate the UE's 115-e identifying a control channel decoding candidate based on the antenna port.

UE 115-e may also include a processor 1005, and memory 1015 (including software (SW) 1020), a transceiver 1035, and one or more antenna(s) 1040, each of which may communicate, directly or indirectly, with one another (e.g., via buses 1045). The transceiver 1035 may communicate bi-directionally, via the antenna(s) 1040 or wired or wireless links, with one or more networks, as described above. For example, the transceiver 1035 may communicate bi-directionally with a base station 105 or another UE 115. The transceiver 1035 may include a modem to modulate the packets and provide the modulated packets to the antenna(s) 1040 for transmission, and to demodulate packets received from the antenna(s) 1040. While UE 115-*e* may include a single antenna 1040, UE 115-*e* may also have multiple antennas 1040 capable of concurrently transmitting or receiving multiple wireless transmissions.

The memory 1015 may include random access memory (RAM) and read only memory (ROM). The memory 1015 may store computer-readable, computer-executable software/firmware code 1020 including instructions that, when executed, cause the processor 1005 to perform various functions described herein (e.g., DMRS based DL low latency operations, etc.). Alternatively, the software/firmware code 1020 may not be directly executable by the processor 1005 but cause a computer (e.g., when compiled and executed) to perform functions described herein. The processor 1005 may include an intelligent hardware device, (e.g., a central processing unit (CPU), a microcontroller, an ASIC, etc.)

Figure 11:
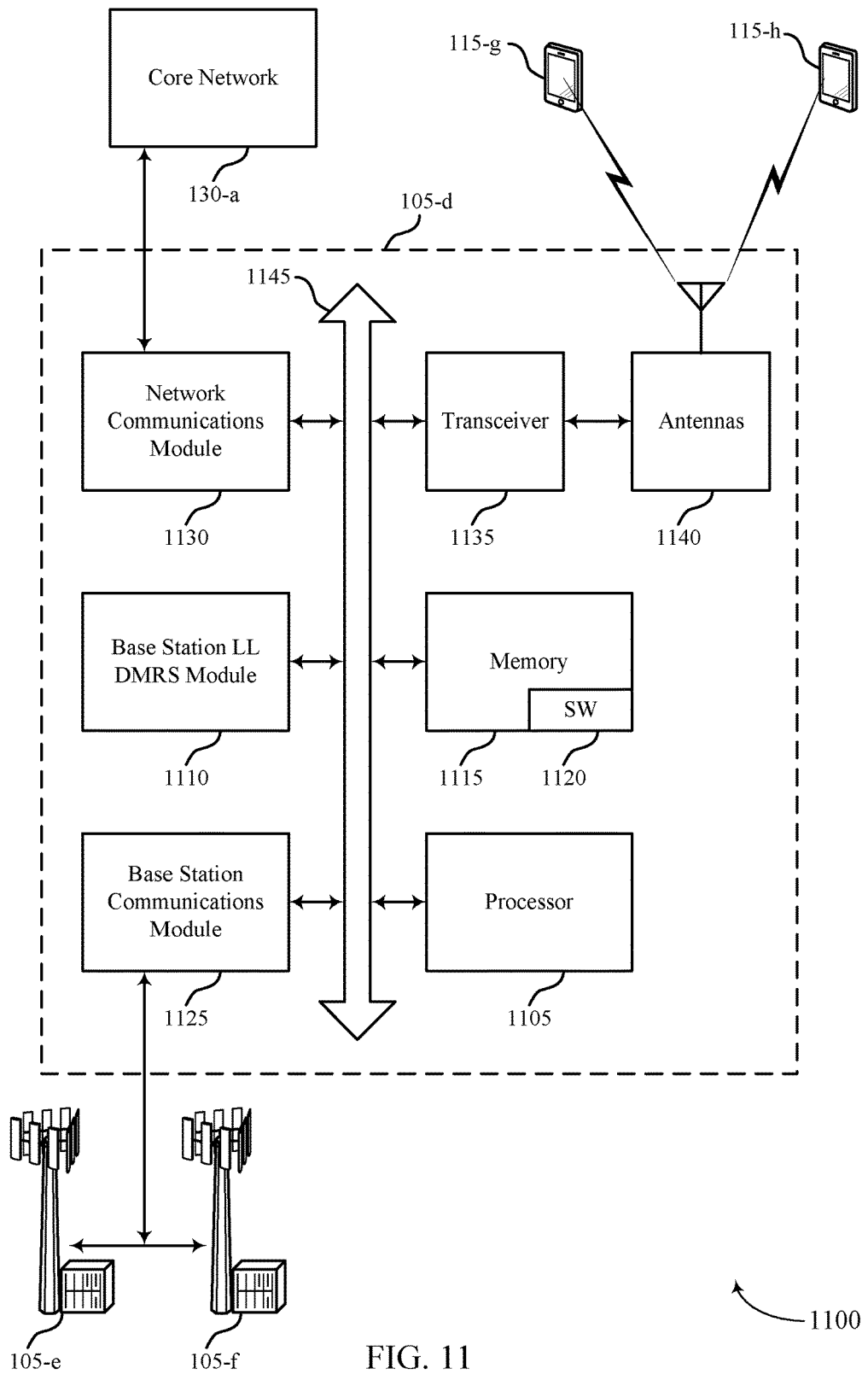
FIG. 11 illustrates an example system including a base station that supports DMRS based DL low latency operations in accordance with various aspects of the present disclosure.

FIG. 11 shows a diagram of a system 1100 including a base station 105 configured for DMRS based DL low latency operations in accordance with various aspects of the present disclosure. System 1100 may include base station 105-*d*, which may be an example of a wireless device 700 or wireless device 800, or a base station 105 described herein with reference to FIGS. 1, 2 and 8-10. Base Station 105-*d* may include a base station LL DMRS module 1110, which may be an example of a LL DMRS module 710 described with reference to FIGS. 7-9. Base Station 105-*d* may also include components for bi-directional voice and data communications including components for transmitting communications and components for receiving communications. For example, base station 105-*d* may communicate bi-directionally with UEs 115-*g* and 115-*h*.

In some cases, base station 105-*d* may have one or more wired backhaul links. Base station 105-*d* may have a wired backhaul link (e.g., S1 interface, etc.) to the core network 130. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communications module 1125. In some examples, base station communications module 1125 may provide an X2 interface within an LTE/LTE-A wireless communication network technology to provide communication between some of the base stations 105. In some examples, base station 105-*d* may communicate with other base stations through core network 130. In some cases, base station 105-*d* may communicate with the core network 130-*a* through network communications module 1130.

The base station 105-*d* may include a processor 1105, memory 1115 (including software (SW) 1120), transceiver 1135, and antenna(s) 1140, which each may be in communication, directly or indirectly, with one another (e.g., over bus system 1145). The transceivers 1135 may be configured to communicate bi-directionally, via the antenna(s) 1140, and with the UEs 115, which may be multi-mode devices. The transceiver 1135 (or other components of the base station 105-*d*) may also be configured to communicate bi-directionally, via the antennas 1140, with one or more other base stations (not shown). The transceiver 1135 may include a modem configured to modulate the packets and provide the modulated packets to the antennas 1140 for transmission, and to demodulate packets received from the antennas 1140. The base station 105-*d* may include multiple transceivers 1135, each with one or more associated antennas 1140. The transceiver may be an example of a combined receiver 705 and transmitter 715 of FIG. 7.

The memory 1115 may include RAM and ROM. The memory 1115 may also store computer-readable, computer-executable software code 1120 containing instructions that are configured to, when executed, cause the processor 1105 to perform various functions described herein (e.g., DM-RS based DL low latency, selecting coverage enhancement techniques, call processing, database management, message routing, etc.). Alternatively, the software 1120 may not be directly executable by the processor 1105 but be configured to cause the computer, e.g., when compiled and executed, to perform functions described herein. The processor 1105 may include an intelligent hardware device, e.g., a CPU, a microcontroller, an ASIC, etc. The processor 1105 may include various special purpose processors such as encoders, queue processing modules, base band processors, radio head controllers, digital signal processor (DSPs), and the like.

The base station communications module 1125 may manage communications with other base stations 105. The communications management module may include a controller or scheduler for controlling communications with UEs 115 in cooperation with other base stations 105. For example, the base station communications module 1125 may coordinate scheduling for transmissions to UEs 115 for various interference mitigation techniques such as beamforming or joint transmission.

Figure 12:
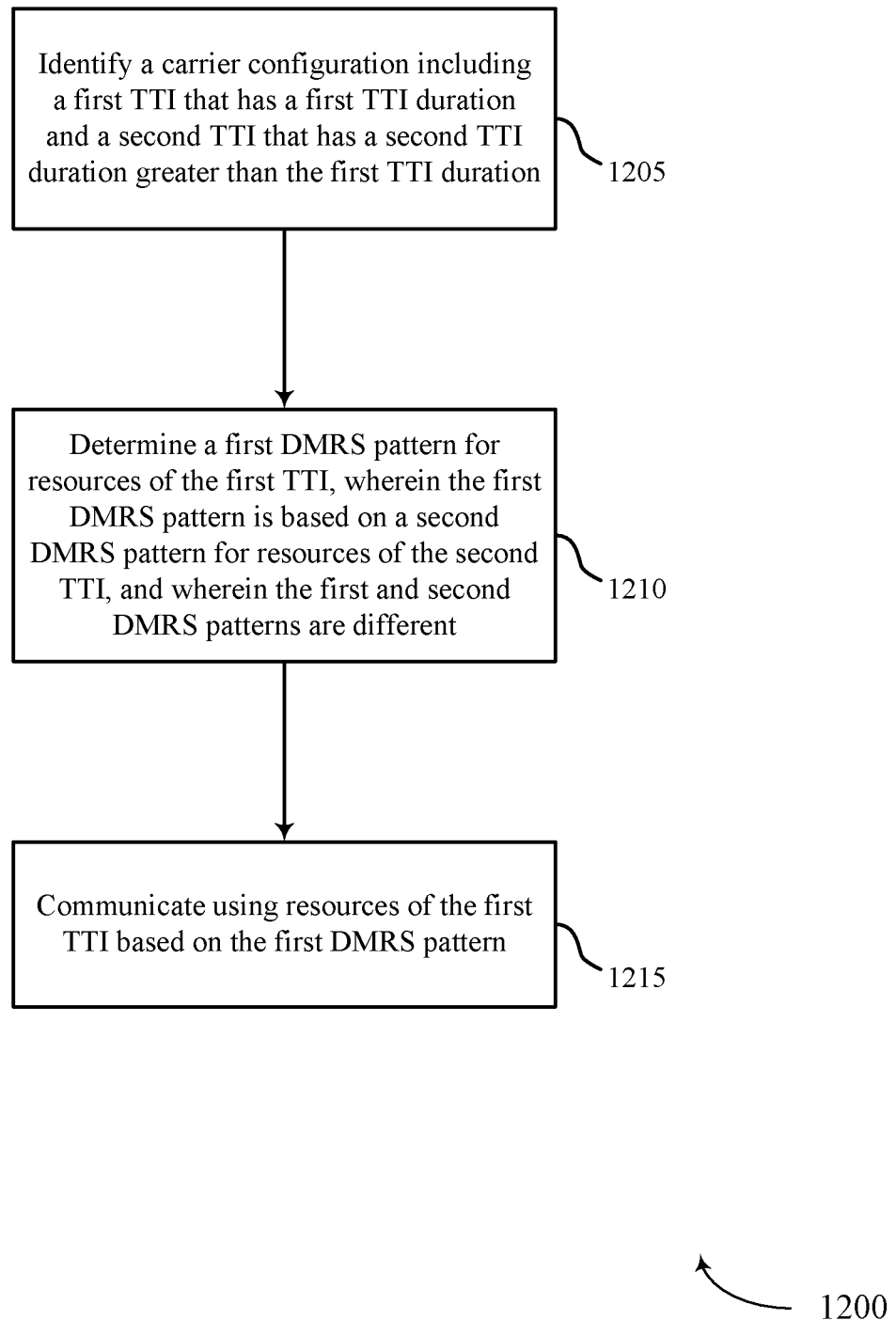
FIGS. 12-17 illustrate a method or methods for DMRS based DL low latency operations in accordance with various aspects of the present disclosure.

FIG. 12 shows a flowchart illustrating a method 1200 for DMRS based DL low latency operations in accordance with various aspects of the present disclosure. The operations of method 1200 may be implemented by a UE 115 or a base station 105, or their respective components, as described with reference to FIGS. 1-11. For example, the operations of method 1200 may be performed by the LL DMRS module 710 as described with reference to FIGS. 7-11. In some examples, a UE 115 or base station 105 may execute a set of codes to control the functional elements of the UE 115 or base station 105 to perform the functions described below. Additionally or alternatively, the UE 115 or base station 105 may perform aspects the functions described below using special-purpose hardware.

At block 1205, the UE 115 or base station 105 may identify a carrier configuration including a first TTI that has a first TTI duration and a second TTI that has a second TTI duration greater than the first TTI duration as described herein with reference to FIGS. 2-6. In certain examples, the operations of block 1205 may be performed by the TTI identification module 805 as described herein with reference to FIG. 8.

At block 1210, UE 115 or base station 105 may determine a first DMRS pattern for resources of the first TTI, where the first DMRS pattern may be based on a second DMRS pattern for resources of the second TTI, as described herein with reference to FIGS. 2-6. In some examples, the first and second DMRS patterns may be different. In certain examples, the operations of block 1210 may be performed by the DMRS pattern determination module 810 as described herein with reference to FIG. 8.

At block 1215, the UE 115 or base station 105 may communicate using resources of the first TTI based on the first DMRS pattern as described herein with reference to FIGS. 2-6. In certain examples, the operations of block 1215 may be performed by the DMRS based demodulation module 815 as described herein with reference to FIG. 8.

Figure 13:
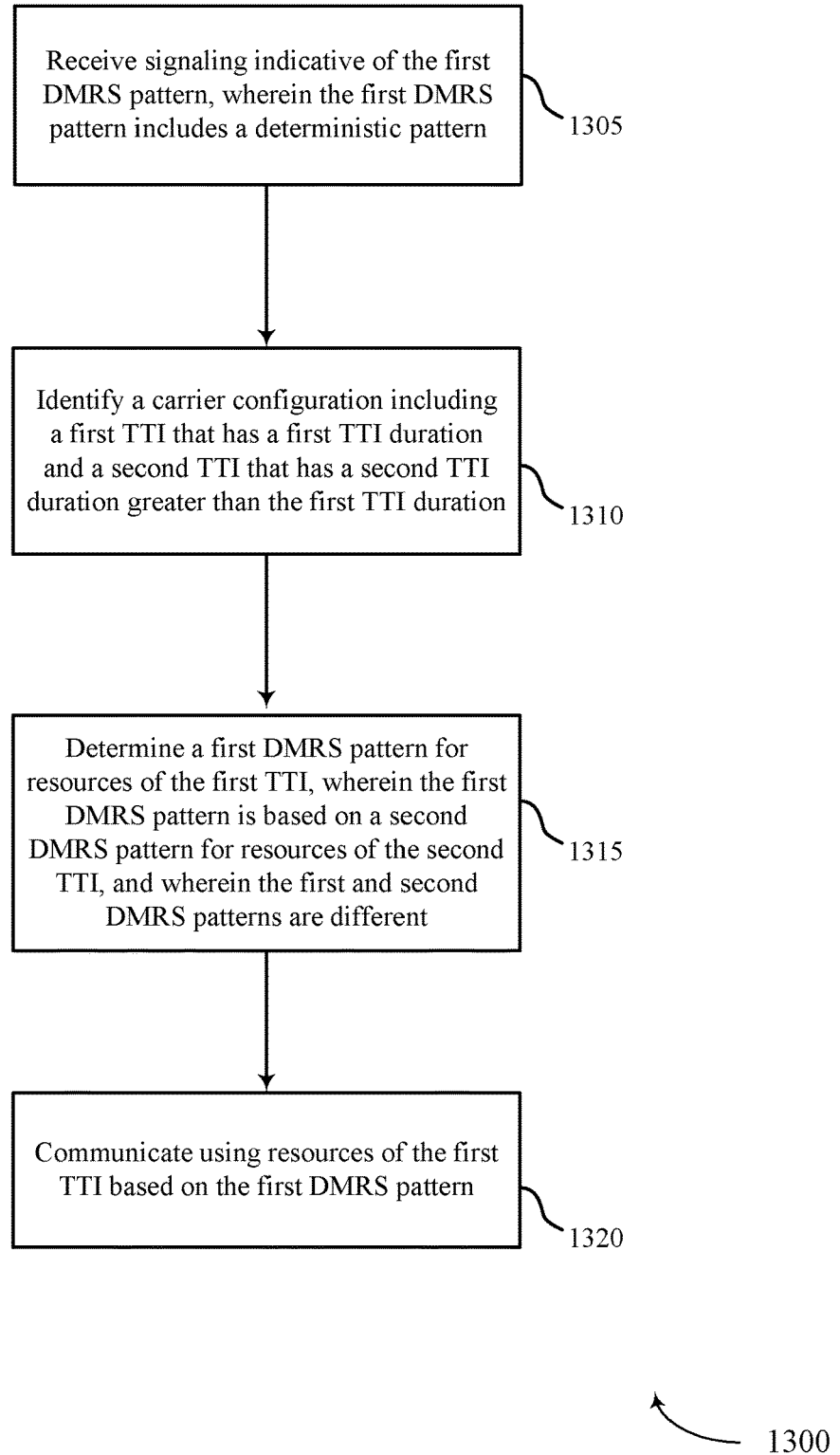

FIG. 13 shows a flowchart illustrating a method 1300 for DMRS based DL low latency operations in accordance with various aspects of the present disclosure The operations of method 1300 may be implemented by a UE 115 or a base station 105, or their respective components, as described with reference to FIGS. 1-11. For example, the operations of method 1300 may be performed by the LL DMRS module 710 as described with reference to FIGS. 7-11. In some examples, a UE 115 or base station 105 may execute a set of codes to control the functional elements of the UE 115 or base station 105 to perform the functions described below. Additionally or alternatively, the UE 115 or base station 105 may perform aspects the functions described below using special-purpose hardware. The method 1300 may also incorporate aspects of method 1200 of FIG. 12.

At block 1305, the UE 115 or base station 105 may receive signaling indicative of the first DMRS pattern, where the first DMRS pattern may be a deterministic pattern as described herein with reference to FIGS. 2-6. In certain examples, the operations of block 1320 may be performed by the DMRS pattern configuration module 910 as described herein with reference to FIG. 9.

At block 1310, the UE 115 or base station 105 may identify a carrier configuration including a first TTI that has a first TTI duration and a second TTI that has a second TTI duration greater than the first TTI duration as described herein with reference to FIGS. 2-6. In certain examples, the operations of block 1305 may be performed by the TTI identification module 805 as described herein with reference to FIG. 8.

At block 1315, the UE 115 or base station 105 may determine a first DMRS pattern for resources of the first TTI, where the first DMRS pattern is based on a second DMRS pattern for resources of the second TTI, as described herein with reference to FIGS. 2-6. In certain examples, the operations of block 1310 may be performed by the DMRS pattern determination module 810 as described herein with reference to FIG. 8.

At block 1320, the UE 115 or base station 105 may communicate using resources of the first TTI based on the first DMRS pattern as described herein with reference to FIGS. 2-6. In certain examples, the operations of block 1315 may be performed by the DMRS based demodulation module 815 as described herein with reference to FIG. 8.

Figure 14:
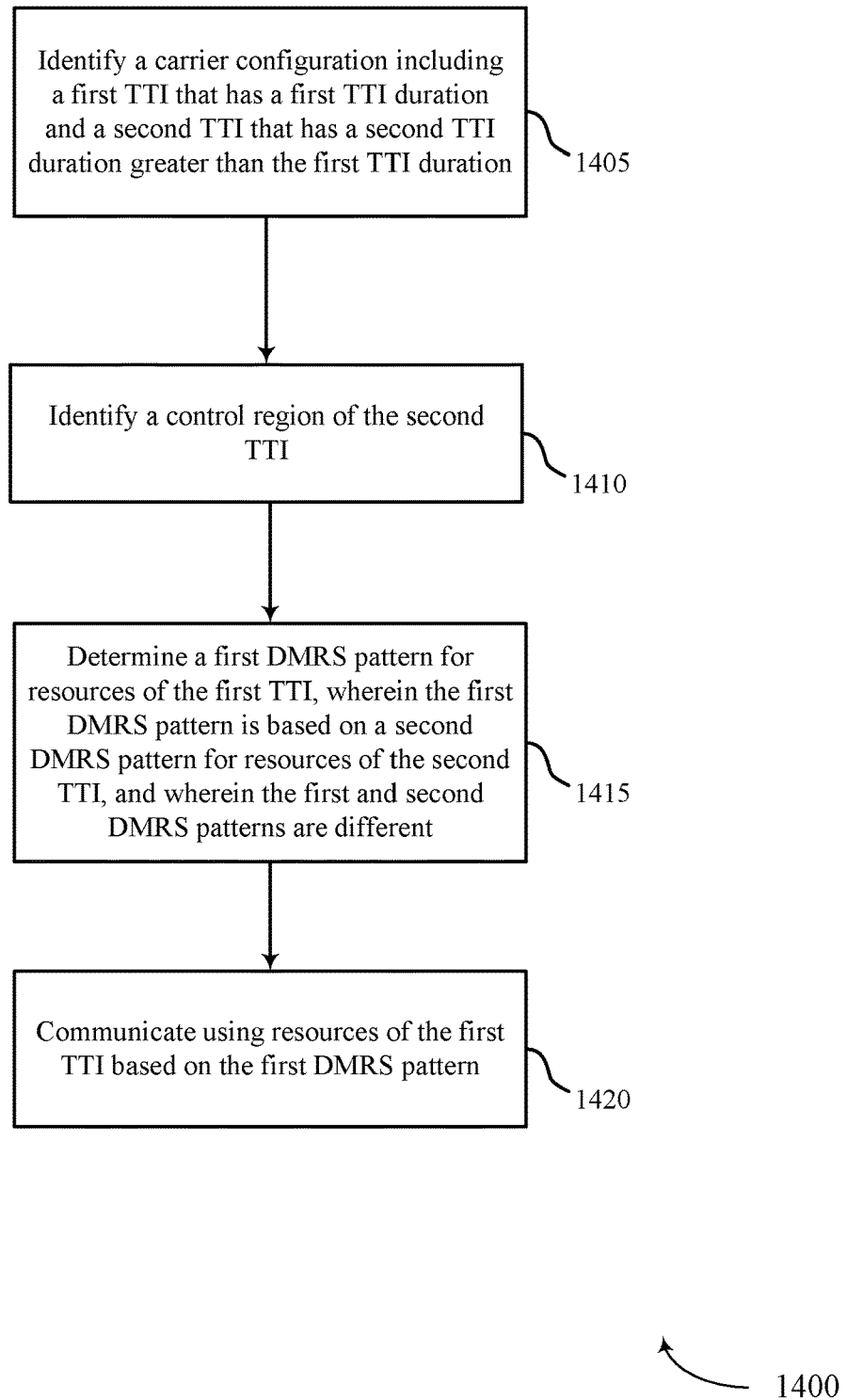

FIG. 14 shows a flowchart illustrating a method 1400 for DMRS based DL low latency operations in accordance with various aspects of the present disclosure. The operations of method 1400 may be implemented by a UE 115 or a base station 105, or their respective components, as described with reference to FIGS. 1-11. For example, the operations of method 1400 may be performed by the LL DMRS module 710 as described with reference to FIGS. 7-10. In some examples, a UE 115 or a base station 105 115 may execute a set of codes to control the functional elements of the UE 115 or a base station 105 to perform the functions described below. Additionally or alternatively, the UE 115 or a base station 105 may perform aspects the functions described below using special-purpose hardware. The method 1400 may also incorporate aspects of methods 1200, and 1300 of FIGS. 12-13.

At block 1405, the UE 115 or a base station 105 may identify a carrier configuration including a first TTI that has a first TTI duration and a second TTI that has a second TTI duration greater than the first TTI duration as described herein with reference to FIGS. 2-6. In certain examples, the operations of block 1405 may be performed by the TTI identification module 805 as described herein with reference to FIG. 8.

At block 1410, the UE 115 or a base station 105 may identify a control region of the second TTI as described herein with reference to FIGS. 2-6. In certain examples, the operations of block 1420 may be performed by the control region identification module 915 as described herein with reference to FIG. 9.

At block 1415, the UE 115 or a base station 105 may determine a first DMRS pattern for resources of the first TTI, where the first DMRS pattern is based at least in part on a second DMRS pattern for resources of the second TTI, as described herein with reference to FIGS. 2-6. In certain examples, the operations of block 1410 may be performed by the DMRS pattern determination module 810 as described herein with reference to FIG. 8.

At block 1420, the UE 115 or a base station 105 may communicate using resources of the first TTI based at least in part on the first DMRS pattern as described herein with reference to FIGS. 2-6. In certain examples, the operations of block 1415 may be performed by the DMRS based demodulation module 815 as described herein with reference to FIG. 8.

Figure 15:
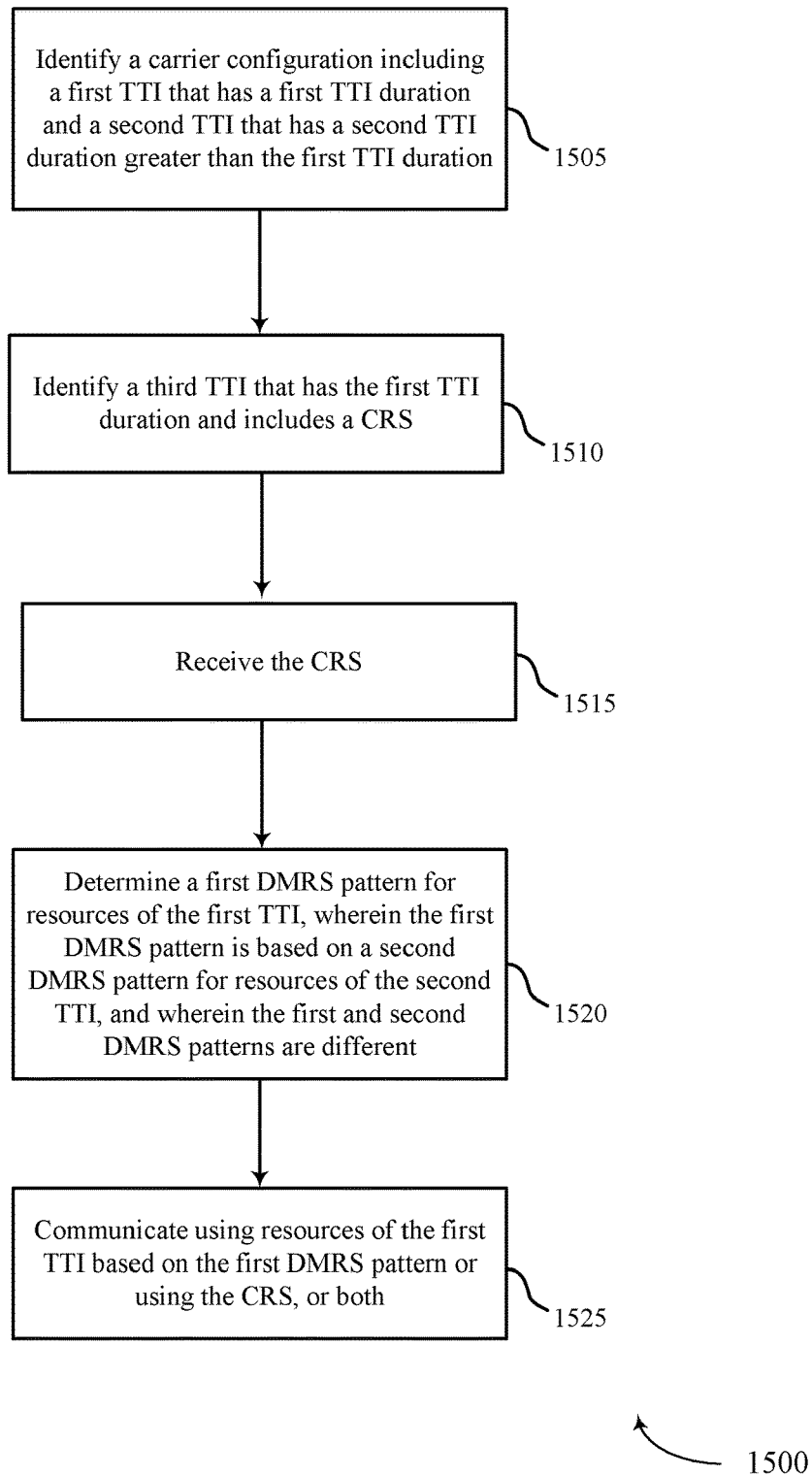

FIG. 15 shows a flowchart illustrating a method 1500 for DMRS based DL low latency operations in accordance with various aspects of the present disclosure. The operations of method 1500 may be implemented by a UE 115 or a base station 105, or their respective components, as described with reference to FIGS. 1-11. For example, the operations of method 1500 may be performed by the LL DMRS module 710 as described with reference to FIGS. 7-10. In some examples, a UE 115 or a base station 105 may execute a set of codes to control the functional elements of the UE 115 or a base station 105 to perform the functions described below. Additionally or alternatively, the UE 115 or a base station 105 may perform aspects the functions described below using special-purpose hardware. The method 1500 may also incorporate aspects of methods 1200, 1300, and 1400 of FIGS. 12-14.

At block 1505, the UE 115 or a base station 105 may identify a carrier configuration including a first TTI that has a first TTI duration and a second TTI that has a second TTI duration greater than the first TTI duration as described herein with reference to FIGS. 2-6. In certain examples, the operations of block 1505 may be performed by the TTI identification module 805 as described herein with reference to FIG. 8.

At block 1510, the UE 115 or a base station 105 may identify a third TTI that has a duration less than the second TTI duration as described herein with reference to FIGS. 2-6. In some cases, the third TTI includes a CRS. In certain examples, the operations of block 1510 may be performed by the TTI identification module 805 as described herein with reference to FIG. 8.

At block 1515, the UE 115 or a base station 105 may receive the CRS as described herein with reference to FIGS. 2-6. In certain examples, the operations of block 1515 may be performed by the CRS identification module 925 as described herein with reference to FIG. 9.

At block 1520, UE 115 or a base station 105 may determine a first DMRS pattern for resources of the first TTI, where the first DMRS pattern is based at least in part on a second DMRS pattern for resources of the second TTI, and the first and second DMRS patterns may be different as described herein with reference to FIGS. 2-6. In certain examples, the operations of block 1520 may be performed by the DMRS pattern determination module 810 as described herein with reference to FIG. 8.

At block 1525, the UE 115 or a base station 105 may communicate using resources of the first TTI based at least in part on the first DMRS pattern as described herein with reference to FIGS. 2-6. In some cases, communicating includes demodulating signals based at least in part on one of a DMRS symbols of the first DMRS pattern or the received CRS, or both. In certain examples, the operations of block 1525 may be performed by the DMRS based demodulation module 815 as described herein with reference to FIG. 8 and/or the transceiver 1035 as described with reference to FIG. 10.

In some examples, UE 115 may communicate using resources of the third TTI based on the CRS pattern. Additionally or alternatively, UE 115 may monitor a first low latency control channel search space associated with the first TTI based on the first DMRS pattern, and it may monitor a second low latency control channel search space associated with the third TTI based on the CRS pattern. Such operations may, for example, be performed by the processor 1005 and transceiver 1035, as described with reference to FIG. 10.

Figure 16:
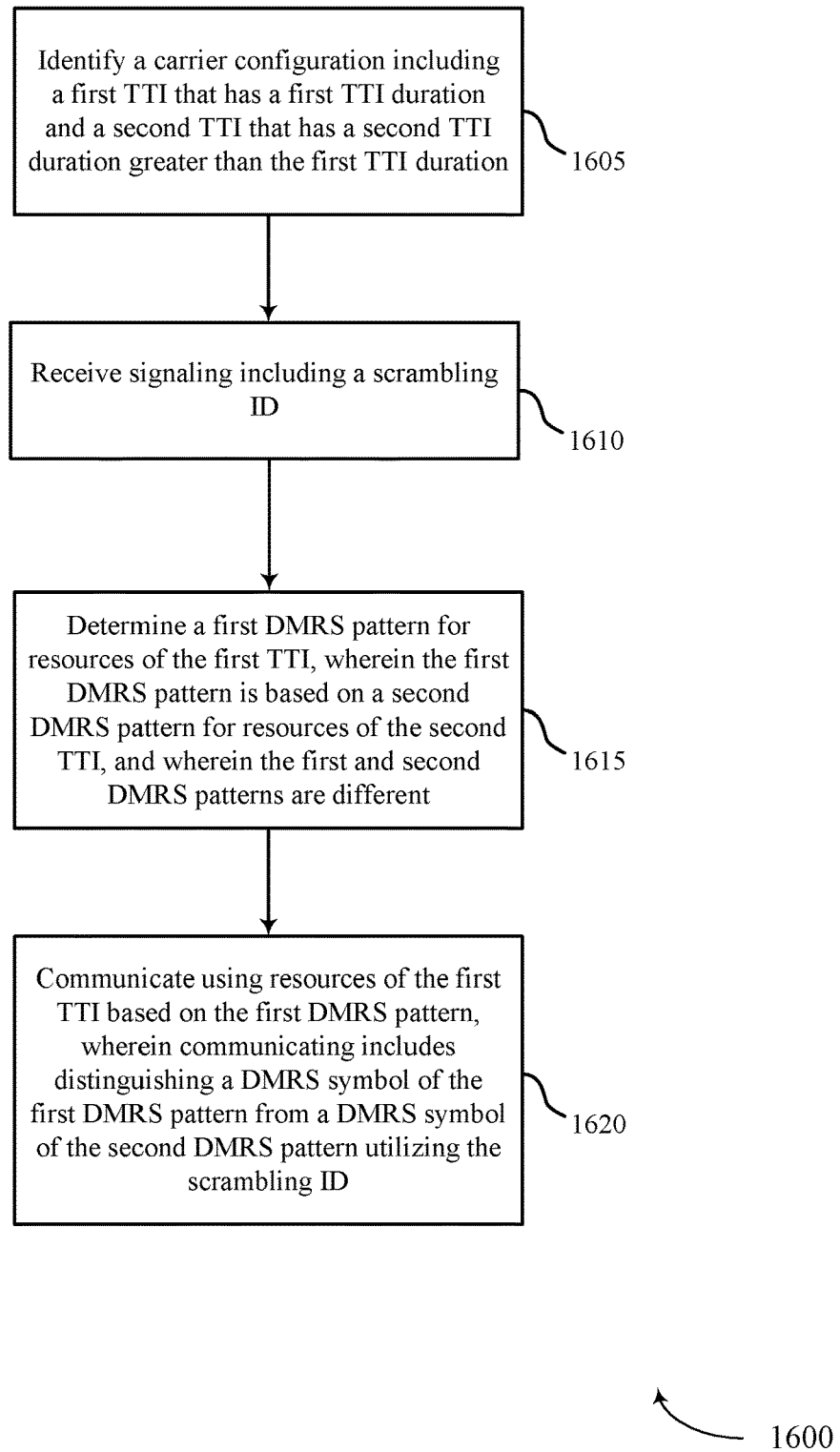

FIG. 16 shows a flowchart illustrating a method 1600 for DMRS based DL low latency operations in accordance with various aspects of the present disclosure. The operations of method 1600 may be implemented by a UE 115 or a base station 105, or their respective components, as described with reference to FIGS. 1-11. For example, the operations of method 1600 may be performed by the LL DMRS module 710 as described with reference to FIGS. 7-10. In some examples, a UE 115 or a base station 105 may execute a set of codes to control the functional elements of the UE 115 or a base station 105 to perform the functions described below. Additionally or alternatively, the UE 115 or a base station 105 may perform aspects the functions described below using special-purpose hardware. The method 1600 may also incorporate aspects of methods 1200, 1300, 1400, and 1500 of FIGS. 12-15.

At block 1605, the UE 115 or a base station 105 may identify a carrier configuration including a first TTI that has a first TTI duration and a second TTI that has a second TTI duration greater than the first TTI duration as described herein with reference to FIGS. 2-6. In certain examples, the operations of block 1605 may be performed by the TTI identification module 805 as described herein with reference to FIG. 8.

At block 1610, the UE 115 or a base station 105 may receive signaling including a scrambling ID as described herein with reference to FIGS. 2-6. In certain examples, the operations of block 1620 may be performed by the scrambling ID identification module 940 as described herein with reference to FIG. 9.

At block 1615, the UE 115 or a base station 105 may determine a first DMRS pattern for resources of the first TTI, where the first DMRS pattern is based at least in part on a second DMRS pattern for resources of the second TTI, and the first and second DMRS patterns may be different as described herein with reference to FIGS. 2-6. In certain examples, the operations of block 1610 may be performed by the DMRS pattern determination module 810 as described herein with reference to FIG. 8.

At block 1620, the UE 115 or a base station 105 may communicate using resources of the first TTI based at least in part on the first DMRS pattern as described herein with reference to FIGS. 2-6. In some cases, communicating may include distinguishing DMRS of the first DMRS pattern from DMRS of the second DMRS pattern utilizing the scrambling ID. In certain examples, the operations of block 1615 may be performed by the DMRS based demodulation module 815 as described herein with reference to FIG. 8.

Figure 17:
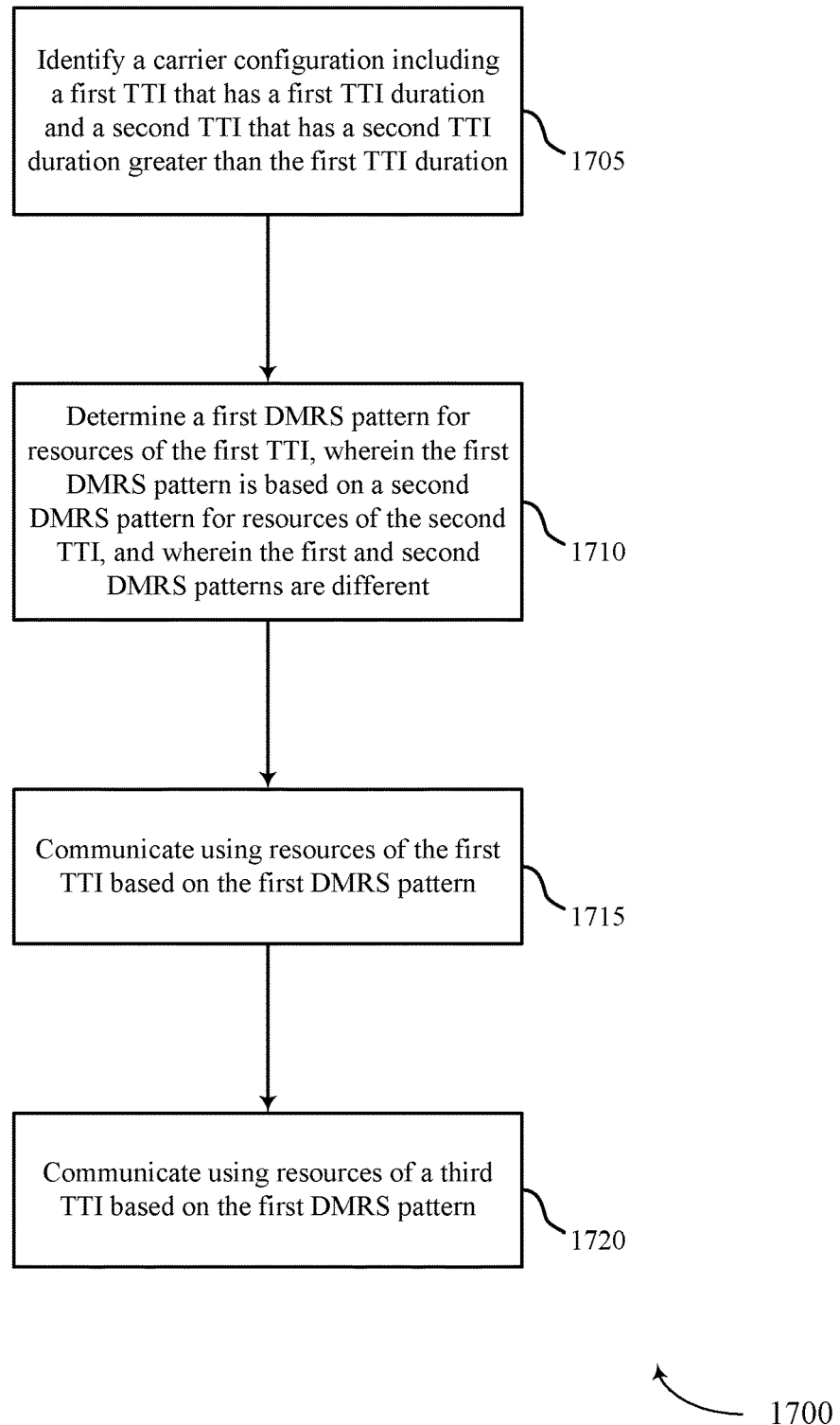

FIG. 17 shows a flowchart illustrating a method 1700 for DMRS based DL low latency operations in accordance with various aspects of the present disclosure. The operations of method 1600 may be implemented by a UE 115 or a base station 105, or their respective components, as described with reference to FIGS. 1-11. For example, the operations of method 1700 may be performed by the LL DMRS module 710 as described with reference to FIGS. 7-10. In some examples, a UE 115 or a base station 105 may execute a set of codes to control the functional elements of the UE 115 or a base station 105 to perform the functions described below. Additionally or alternatively, the UE 115 or a base station 105 may perform aspects the functions described below using special-purpose hardware. The method 1700 may also incorporate aspects of methods 1200, 1300, 1400, 1500, and 1600 of FIGS. 12-16.

At block 1705, the UE 115 or a base station 105 may identify a carrier configuration that includes a first TTI that has a first TTI duration and a second TTI that has a second TTI duration greater than the first TTI duration as described herein with reference to FIGS. 2-6. In certain examples, the operations of block 1705 may be performed by the TTI identification module 805 as described herein with reference to FIG. 8.

At block 1710, the UE 115 or a base station 105 may determine a first DMRS pattern for resources of the first TTI, where the first DMRS pattern is based at least in part on a second DMRS pattern for resources of the second TTI, as described herein with reference to FIGS. 2-6. In certain examples, the operations of block 1710 may be performed by the DMRS pattern determination module 810 as described herein with reference to FIG. 8.

At block 1715, the UE 115 or a base station 105 communication using resources of the first TTI based on the first DMRS pattern as described herein with reference to FIGS. 2-6. In certain examples, the operations of block 1715 may be performed by the DMRS based demodulation module 815 as described herein with reference to FIG. 8 and/or the transceiver 1035 as described with reference to FIG. 10

At block 1720, UE 115 or a base station 105 may communicate using resources of a third TTI based at least in part on the first DMRS pattern as described herein with reference to FIGS. 2-6. In certain examples, the operations of block 1720 may be performed by the DMRS based demodulation module 815 as described herein with reference to FIG. 8 and/or the transceiver 1035 as described with reference to FIG. 10. In some examples, the third TTI has a duration less than the second TTI duration; and in some examples, the third TTI has the second TTI duration.

Thus, methods 1200, 1300, 1400, 1500, 1600, and 1700 may provide for DM-RS based DL low latency. It should be noted that methods 1200, 1300, 1400, 1500, 1600, and 1700 describe possible implementation, and that the operations and the steps may be rearranged or otherwise modified such that other implementations are possible. In some examples, aspects from two or more of the methods 1200, 1300, 1400, 1500, 1600, and 1700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   identifying a carrier configuration configured with a first transmission time interval (TTI) that has a first TTI duration and a second TTI that has a second TTI duration greater than the first TTI duration;
   determining a first demodulation reference signal (DMRS) pattern for resources of the first TTI, wherein the first DMRS pattern is based at least in part on a second DMRS pattern for resources of the second TTI, the first DMRS pattern uses a first set of antenna ports, and the first DMRS pattern is configured with a first type of division multiplexing scheme associated with the first set of antenna ports, the first type of division multiplexing scheme selected from a plurality of different types of division multiplexing schemes based at least in part on a transmission rank, the first type of division multiplexing scheme associated with a first transmission rank and comprising one of frequency-division multiplexing (FDM), code-division multiplexing (CDM), or time-division multiplexing (TDM), and a second type of division multiplexing scheme of the plurality of different types of division multiplexing schemes associated with a second transmission rank and comprising one of FDM, CDM, or TDM, the first type of division multiplexing scheme different from the second type of division multiplexing scheme; and
   communicating using resources of the first TTI based at least in part on the first DMRS pattern.

2. The method of claim 1, wherein an orthogonal cover code (OCC) is applied with the first type of division multiplexing scheme.

3. The method of claim 1, wherein the second TTI comprises a Long Term Evolution (LTE) subframe and the first TTI comprises one or more LTE symbol periods.

4. The method of claim 1, further comprising:
receiving signaling indicative of the first DMRS pattern, wherein the first DMRS pattern comprises a deterministic pattern.

5. The method of claim 4, wherein the signaling indicative of the first DMRS pattern comprises at least one of a port value, an, or a relationship of a low latency data channel and a low latency control channel, or any combination thereof.

6. The method of claim 1, further comprising:
identifying a control region of the second TTI; and
refraining from communication using the first DMRS pattern during the first TTI within the control region of the second TTI.

7. The method of claim 1, further comprising:
identifying a third TTI that has a third duration less than the second TTI duration;
determining a cell-specific reference signal (CRS) pattern for resources of the third TTI; and
communicating using resources of the third TTI based at least in part on the CRS pattern.

8. The method of claim 7, further comprising:
monitoring a first low latency control channel search space associated with the first TTI based at least in part on the first DMRS pattern; and
monitoring a second low latency control channel search space associated with the third TTI based at least in part on the CRS pattern.

9. The method of claim 1, further comprising:
monitoring a control channel search space in the first TTI, wherein the monitoring is based at least in part on the first DMRS pattern or a CRS pattern.

10. The method of claim 1, wherein the resources of the first TTI comprises a bundle of resource blocks with a same precoding.

11. The method of claim 1, further comprising:
receiving signaling including a scrambling identification, wherein communicating comprises distinguishing a DMRS symbol of the first DMRS pattern from a DMRS symbol of the second DMRS pattern based at least in part on the scrambling identification.

12. The method of claim 1, wherein the communicating using resources of the first TTI is based at least in part on the transmission rank.

13. The method of claim 1, further comprising:
communicating using resources of a third TTI based at least in part on the first DMRS pattern.

14. The method of claim 13, wherein the third TTI has a third TTI duration, and wherein the third TTI duration less than the second TTI duration.

15. The method of claim 13, wherein the third TTI has the second TTI duration.

16. An apparatus for wireless communication, comprising:
means for identifying a carrier configuration configured with a first transmission time interval (TTI) that has a first TTI duration and a second TTI that has a second TTI duration greater than the first TTI duration;
means for determining a first demodulation reference signal (DMRS) pattern for resources of the first TTI, wherein the first DMRS pattern is based at least in part on a second DMRS pattern for resources of the second TTI, the first DMRS pattern uses a first set of antenna ports, and the first DMRS pattern is configured with a first type of division multiplexing scheme associated with the first set of antenna ports, the first type of division multiplexing scheme selected from a plurality of different types of division multiplexing schemes based at least in part on a transmission rank, the first type of division multiplexing scheme associated with a first transmission rank and comprising one of frequency-division multiplexing (FDM), code-division multiplexing (CDM), or time-division multiplexing (TDM), and a second type of division multiplexing scheme of the plurality of different types of division multiplexing schemes associated with a second transmission rank and comprising one of FDM, CDM, or TDM, the first type of division multiplexing scheme different from the second type of division multiplexing scheme; and
means for communicating using resources of the first TTI based at least in part on the first DMRS pattern.

17. An apparatus for wireless communication, comprising:
a processor;
memory in electronic communication with the processor; and
instructions stored in the memory and operable, when executed by the processor, to cause the apparatus to:
identify a carrier configuration configured with a first transmission time interval (TTI) that has a first TTI duration and a second TTI that has a second TTI duration greater than the first TTI duration;
determine a first demodulation reference signal (DMRS) pattern for resources of the first TTI, wherein the first DMRS pattern is based at least in part on a second DMRS pattern for resources of the second TTI, the first DMRS pattern uses a first set of antenna ports, and the first DMRS pattern is configured with a first type of division multiplexing scheme associated with the first set of antenna ports, the first type of division multiplexing scheme selected from a plurality of different types of division multiplexing schemes based at least in part on a transmission rank, the first type of division multiplexing scheme associated with a first transmission rank and comprising one of frequency-division multiplexing (FDM), code-division multiplexing (CDM), or time-division multiplexing (TDM), and a second type of division multiplexing scheme of the plurality of different types of division multiplexing schemes associated with a second transmission rank and comprising one of FDM, CDM, or TDM, the first type of division multiplexing scheme different from the second type of division multiplexing scheme; and
communicate using resources of the first TTI based at least in part on the first DMRS pattern.

18. The apparatus of claim 17, wherein the instructions are executable to cause the apparatus to:
receive signaling indicative of the first DMRS pattern, wherein the first DMRS pattern comprises a deterministic pattern.

19. The apparatus of claim 17, wherein the instructions are executable to cause the apparatus to:
identify a control region of the second TTI, wherein the second TTI comprises the first TTI; and
refrain from communication using the first DMRS pattern during the first TTI within the control region of the second TTI.

20. The apparatus of claim 17, wherein the instructions are executable to cause the apparatus to:
identify a third TTI that has a third TTI duration less than the second TTI duration;
determine a cell-specific reference signal (CRS) pattern for resources of the third TTI; and communicate using resources of the third TTI based at least in part on the CRS pattern.

21. The apparatus of claim 20, wherein the instructions are executable to cause the apparatus to:
monitor a first low latency control channel search space associated with the first TTI based at least in part on the first DMRS pattern; and
monitor a second low latency control channel search space associated with the third TTI based at least in part on the CRS pattern.

22. The apparatus of claim 17, wherein the instructions are executable to cause the apparatus to:
monitor a control channel search space in the first TTI, wherein the monitoring is based at least in part on the first DMRS pattern or CRS pattern.

23. The apparatus of claim 17, wherein the instructions are executable to cause the apparatus to:
receive signaling including a scrambling identification, wherein communicating comprises distinguishing a DMRS symbol of the first DMRS pattern from a DMRS symbol of the second DMRS pattern based on the scrambling identification.

24. The apparatus of claim 17, wherein the instructions are executable to cause the apparatus to:
communicate using resources of a third TTI based at least in part on the first DMRS pattern, wherein the third TTI has a third TTI duration, and wherein the third TTI duration is less than the second TTI duration.

25. The apparatus of claim 17, wherein the instructions are executable to cause the apparatus to:
communicate using resources of a third TTI based at least in part on the first DMRS pattern, wherein the third TTI has a duration equal to the second TTI duration.

26. A non-transitory computer-readable medium storing code for wireless communication, the code comprising instructions executable to:
identify a carrier configuration configured with a first transmission time interval (TTI) that has a first TTI duration and a second TTI that has a second TTI duration greater than the first TTI duration;
determine a first demodulation reference signal (DMRS) pattern for resources of the first TTI, wherein the first DMRS pattern is based at least in part on a second DMRS pattern for resources of the second TTI, the first DMRS pattern uses a first set of antenna ports, and the first DMRS pattern is configured with a first type of division multiplexing scheme associated with the first set of antenna ports, the first type of division multiplexing scheme selected from a plurality of different types of division multiplexing schemes based at least in part on a transmission rank, the first type of division multiplexing scheme associated with a first transmission rank and comprising one of frequency-division multiplexing (FDM), code-division multiplexing (CDM), or time-division multiplexing (TDM), and a second type of division multiplexing scheme of the plurality of different types of division multiplexing schemes associated with a second transmission rank and comprising one of FDM, CDM, or TDM, the first type of division multiplexing scheme different from the second type of division multiplexing scheme; and
communicate using resources of the first TTI based at least in part on the first DMRS pattern.

27. The method of claim 1, wherein the first type of multiplexing scheme is selected to be CDM based at least in part on the transmission rank being the second transmission rank.

* * * * *